(12) United States Patent
Igarashi

(10) Patent No.: US 7,880,947 B2
(45) Date of Patent: Feb. 1, 2011

(54) ILLUMINATED POSITION ADJUSTING METHOD IN OPTICAL SCANNING APPARATUS

(75) Inventor: Jun Igarashi, Nikko (JP)

(73) Assignee: Canon Kabushiki Kaisha (JP)

( * ) Notice: Subject to any disclaimer, the term of this patent is extended or adjusted under 35 U.S.C. 154(b) by 0 days.

(21) Appl. No.: 12/691,357

(22) Filed: Jan. 21, 2010

(65) Prior Publication Data

US 2010/0182669 A1  Jul. 22, 2010

(30) Foreign Application Priority Data

Jan. 21, 2009 (JP) ............................. 2009-010535

(51) Int. Cl.
*G02B 26/08* (2006.01)
(52) U.S. Cl. .................................................. 359/201.1
(58) Field of Classification Search .............. 359/201.1, 359/204.1, 205.1–207.1
See application file for complete search history.

(56) References Cited

U.S. PATENT DOCUMENTS 6,452,687 B1  9/2002  Suzuki et al.
7,126,735 B1 * 10/2006  Kinoshita et al. ........ 359/204.1
2004/0263933 A1  12/2004  Nakahata

FOREIGN PATENT DOCUMENTS

| JP | 10-133130 A | 5/1998 |
| JP | 11-326804 A | 11/1999 |
| JP | 2005-004050 A | 1/2005 |

* cited by examiner

*Primary Examiner*—Euncha P Cherry
(74) *Attorney, Agent, or Firm*—Rossi, Kimms & McDowell LLP

(57) ABSTRACT

An illuminated position adjusting method used in optical scanning apparatus, suppressing deterioration of imaging spot shape on scanning surface, and preventing undesirable light from arriving at the scanning surface, to form high-quality image. The optical scanning apparatus includes: a common deflector for deflecting beams emitted from light source units; and imaging optical units each including at least one imaging optical element and at least one reflector which are disposed in optical path of beam deflected by the common deflector, and image the beam on scanning surface. In an optical path in which the largest number of the reflectors are disposed among the optical paths guided to the scanning surfaces, the reflector which is disposed optically closest to the scanning surface is rotated in sub-scanning direction, to adjust the illuminated position of the beam, which illuminates the scanning surface, on the scanning surface in sub-scanning direction.

18 Claims, 9 Drawing Sheets

ILLUMINATED POSITION ADJUSTING METHOD IN OPTICAL SCANNING APPARATUS

BACKGROUND OF THE INVENTION

1. Field of the Invention

The present invention relates to an illuminated position adjusting method in an optical scanning apparatus. The present invention is suitable for an image forming apparatus such as a laser beam printer, a digital copying machine, or a multi-function printer, which employs an electrophotographic process.

2. Description of the Related Art

In a color image forming apparatus using an optical scanning apparatus, plural of scanning lines are superimposed on each other to form an image, and hence particularly, it is important to reduce a misalignment of scanning lines among respective colors.

Various optical scanning apparatuses that are installed in such color image forming apparatus have conventionally been presented (see Japanese Patent Application Laid-Open No. H11-326804 and Japanese Patent Application Laid-Open No. 2005-004050).

In Japanese Patent Application Laid-Open No. H11-326804, an alignment of inclination and the curvature of scanning lines in respective optical scanning apparatuses are adjusted by displacing positions of imaging optical elements in the respective scanning apparatuses, to thereby suppress the misalignment of the scanning lines among respective colors in a sub-scanning direction.

Meanwhile, in recent years, in an optical scanning apparatus, as a way to downsize the entire apparatus, there is used a so-called opposed scanning optical system that scans a plurality of light beams by the same (single) optical deflector, and guides the light beams onto respective different surfaces to be scanned by imaging optical units which are disposed on both sides of the optical deflector.

Further, with an aim to realize a color image forming apparatus that performs color image formation of four colors (Y, M, C, and K) by using a single optical deflector, there is used a sub scanning oblique incident optical system that allows a light beam to enter a deflection surface of the optical deflector from an oblique direction within a sub scanning section.

In Japanese Patent Application Laid-Open No. 2005-004050, in the opposed scanning optical system and the sub scanning oblique incident optical system, there is provided a light blocking member that blocks an undesirable light so as to prevent the undesirable light from being allowed to enter the imaging optical element. That is, the undesirable light spatially separated from an actual ray within the sub scanning section is blocked by using the light blocking member. As a result, the undesirable light is prevented from arriving at the surface to be scanned by means of the light blocking member.

In the above-mentioned color image forming apparatus disclosed in Japanese Patent Application Laid-Open No. H11-326804, the optical elements are eccentrically parallelized within the sub scanning section in all of the optical paths of the optical scanning apparatus, to thereby adjust the illuminated positions on the surface to be scanned. For this reason, there is an adverse effect that an imaging spot shape on the surface to be scanned is deteriorated due to the eccentric-parallelizing of the imaging optical elements within the sub scanning section.

Further, in the case of an optical scanning apparatus in which a large number of reflector mirrors are disposed as light beam reflection members within an optical path for the purpose of downsizing the optical scanning apparatus, which has been highly demanded in recent years, a deviation amount in the illuminated position increases due to an insufficient precision in assembling the reflector mirror.

With the above-mentioned action, a parallel eccentric amount within the sub scanning section of the imaging optical element for adjusting the illuminated position also increases. Therefore, the imaging spot shape on the surface to be scanned is deteriorated to the degree that a high-grade image cannot be achieved.

Further, when the illuminated position is adjusted by eccentrically rotating the reflector mirror within the sub scanning section in all of the optical paths of the optical scanning apparatus, there is required an adjusting mechanism for precisely performing the eccentrically rotating of the respective reflector mirrors. As a result, a space for providing the adjusting mechanism is required, and the entire optical scanning apparatus is increased in size.

Further, in the opposed scanning optical system in which the imaging optical systems are symmetrically disposed with the optical deflector sandwiched therebetween as disclosed in Japanese Patent Application Laid-Open No. 2005-004050, there are provided light blocking members (undesirable-light blocking members) for blocking a light beam (undesirable light) reflected by each surface of the imaging optical elements so as not to guide the light beam to the surface to be scanned.

However, when the imaging optical element is largely eccentrically parallelized within the sub scanning section for the purpose of adjusting the illuminated position, there arises a problem that the undesirable light is deviated from the optical path of the undesirable light reflected by each surface of the imaging optical elements, and the undesirable light arrives at the surface to be scanned without being blocked by the light blocking member.

SUMMARY OF THE INVENTION

It is an object of the present invention to provide an illuminated position adjusting method used in an optical scanning apparatus, which is capable of suppressing a deterioration of an imaging spot shape on a surface to be scanned, and preventing an undesirable light from arriving at the surface to be scanned, to thereby form a high-quality image.

In view of the above, according to an embodiment of the present invention, there is provided an adjusting method for an illuminated position in an optical scanning apparatus, the optical scanning apparatus including; a plurality of light source units, a common deflection unit for deflecting for scanning a plurality of light beams emitted from the plurality of light source units, and a plurality of imaging optical units each including at least one imaging optical element and at least one light beam reflection unit which are disposed in optical path of the light beam deflected for scanning on a deflection surface of the common deflection unit, and image the light beam on a surface to be scanned, the adjusting method including rotating the light beam reflection unit, in a sub scanning direction, which is disposed optically closest to the surface to be scanned in an optical path in which a largest number of the light beam reflection units are disposed among the optical paths of the plurality of light beams guided to the plurality of surfaces to be scanned in a sub scanning direction, to thereby adjust the illuminated position of the light beam, which illuminates the surface to be scanned, on the surface to be scanned in the sub scanning direction, and eccentrically parallelizing the imaging optical element, in the sub scanning direction, which is disposed optically closest to the surface to be scanned among the at least one imaging optical element in the optical paths other than the optical path in which the largest number of the light beam reflection units are disposed, to thereby adjust the illuminated position of the light beam on the surface to be scanned in the sub scanning direction.

Further, according to another embodiment of the present invention, there is provided an adjusting method for an illuminated position in an optical scanning apparatus, the optical scanning apparatus including a plurality of optical housings, the plurality of optical housings each containing; a light source unit, a deflection unit for deflecting for scanning a light beam emitted from the light source unit, and an imaging optical unit including at least one imaging optical element and at least one light beam reflection unit which image the light beam deflected for scanning on a deflection surface of the deflection unit, on a surface to be scanned, the adjusting method including rotating the light beam reflection unit, in a sub scanning direction, which is disposed optically closest to the surface to be scanned in an optical housing in which a largest number of the light beam reflection units are disposed in the optical path of the light beam extending from the deflection unit to the surface to be scanned, to thereby adjust the illuminated position of the light beam, which illuminates the surface to be scanned, on the surface to be scanned in the sub scanning direction, and eccentrically parallelizing in the sub scanning direction, the optical housings other than the optical housing in which the largest number of the light beam reflection units are disposed in the optical path extending from the deflection unit to the surface to be scanned, to thereby adjust the illuminated position of the light beam on the surface to be scanned in the sub scanning direction.

Further, according to another embodiment of the present invention, there is provided an adjusting method for an illuminated position in an optical scanning apparatus, the optical scanning apparatus comprising; a plurality of light source units, a common deflection unit for deflecting for scanning a plurality of light beams emitted from the plurality of light source units, and a plurality of imaging optical units each comprising at least one imaging optical element and at least one light beam reflection unit which are disposed in optical paths of the plurality of light beams deflected for scanning on a deflection surface of the common deflection unit, and image the plurality of light beams on a plurality of surfaces to be scanned which are different from each other, the adjusting method comprising rotating the light beam reflection unit, in a sub scanning direction, which is disposed optically closest to the surface to be scanned in an optical path in which a largest number of the light beam reflection units are disposed among the optical paths of the plurality of light beams guided to the plurality of surfaces to be scanned, to thereby adjust the illuminated position of the light beam, which illuminates the surface to be scanned, on the surface to be scanned in the sub scanning direction, and electrically adjusting the illuminated position of the light beam on the surface to be scanned in the sub scanning direction in the optical paths other than the optical path in which the largest number of the light beam reflection units are disposed.

Further, in the adjusting method for an illuminated position in an optical scanning apparatus describe above, it is more preferable that the following condition be satisfied, $$0.5 \times \phi\_all \leq \phi\_adj \leq 2 \times \phi\_all,$$

where in the optical paths others than the optical path in which the largest number of the light beam reflection units are disposed, $\phi\_adj$ represents a power of the imaging optical element disposed optically closest to the surface to be scanned on an optical axis within a sub scanning section among the at least one imaging optical element, and $\phi\_all$ represents a power of all of the at least one imaging optical element disposed in the same optical path on the optical axis within the sub scanning section.

Alternatively, the following conditions be satisfied:

$$0 \leq |dr1/dY\_lens| \leq 5; \text{ and}$$

$$0 \leq |dr2/dY\_lens| \leq 5,$$

where in the adjusting method for an illuminated position in an optical scanning apparatus described above, it is more preferable that, in the optical paths other than the optical path in which the largest number of the light beam reflection units are disposed, $dr1/dY\_lens$ represents a differential value (variation) of a radius of curvature of an incident surface of the imaging optical element disposed optically closest to the surface to be scanned within the sub scanning section in an effective scanning region with respect to a main scanning direction, and $dr2/dY\_lens$ represents a variation of a radius of curvature of an exit surface with respect to the main scanning direction.

Further, in the adjusting method for an illuminated position in an optical scanning apparatus described above, it is more preferable that the plurality of imaging optical units be disposed so as to oppose to each other with respect to a rotating axis of the deflection unit.

According to the present invention, the illuminated position adjusting method in an optical scanning apparatus may be provided, which is capable of suppressing the deterioration of an imaging spot shape on the surface to be scanned, and preventing an undesirable light from arriving at the surface to be scanned, to thereby form a high-quality image.

Further features of the present invention will become apparent from the following description of exemplary embodiments with reference to the attached drawings.

DESCRIPTION OF THE EMBODIMENTS

An optical scanning apparatus according to the present invention includes a plurality of light source units, a common deflection unit for deflecting a plurality of light beams for scanning, and a plurality of imaging optical units including at least one imaging optical element and at least one light beam reflection unit. In a method of adjusting illuminated positions in a sub scanning direction on surfaces to be scanned of the light beams which illuminate the surfaces to be scanned, in an optical path in which a largest number of the light beam reflection units are disposed among a plurality of optical paths, the light beam reflection unit disposed closest to the surface to be scanned is rotated in the sub scanning direction, to thereby adjust the illuminated positions.

Exemplary embodiments of the present invention are described below with reference to the drawings.

First Embodiment

Figure 1:
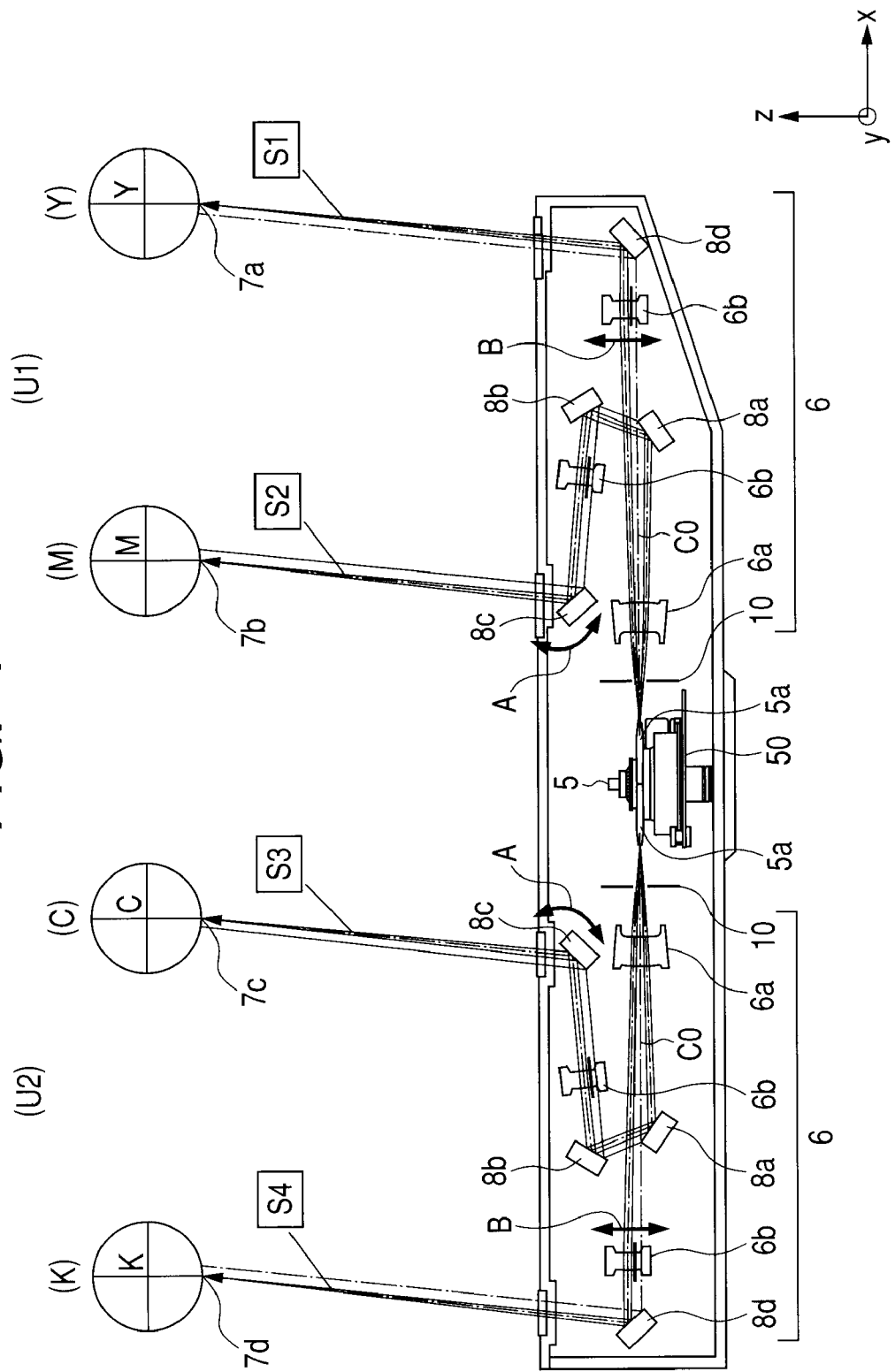
FIG. 1 is a cross-sectional view of an optical scanning apparatus taken along a sub scanning direction according to a first embodiment of the present invention.

FIG. 1 is a main portion sectional view of a sub scanning direction (sub scanning sectional view) according to a first embodiment of the present invention.

In the description below, the sub scanning direction (Z direction) is a direction parallel to a rotating axis of a deflection unit. A main scanning section is a section in which the sub scanning direction (direction parallel to the rotating axis of the deflection unit) is a normal line. A main scanning direction (Y direction) is a direction in which light beams deflected by the deflection unit for scanning are projected on the main scanning section. A sub scanning section is a section in which the main scanning direction is a normal line.

An optical reference axis C0 is an axis passing through an incident point to a deflecting surface of a principal ray of light beams and vertical to the deflecting surface in the sub scanning section when the principal ray of light beams emitted from an incident optical unit is deflected on the deflecting surface of an optical deflector for scanning to enter a center of a surface to be scanned.

An optical scanning apparatus according to this embodiment of the present invention includes first and second scanning units U1 and U2. The first scanning unit U1 is composed of two scanners Y and M for Y (yellow) and M (magenta) colors. The second scanning unit U2 is composed of two scanners C and K for C (cyan) and K (black) colors.

The scanners Y, M, C, and K respectively have optical paths S1, S2, S3, and S4 in the stated order. The optical paths S1 and S2 of the scanners Y and M and the optical paths S3 and S4 of the scanners C and K are located (opposed) symmetrically on both sides of an optical deflector 5, respectively.

The configurations and optical actions of the first and second scanning units U1 and U2 are identical with each other, and hence the first scanning unit U1 is mainly described below. In respective members of the second scanning unit U2, the same members as those of the first scanning unit U1 are denoted by identical reference numerals. The respective members of the second scanning unit U2 are described as the occasion demands.

The optical deflector (polygon mirror) 5 serving as a single (common) deflection unit rotates at a given speed due to a drive unit (not shown) such as a motor, and is shared by the first and second scanning units U1 and U2. Further, the optical deflector 5 deflects for scanning a plurality of light beams emitted from a plurality of light source units.

An imaging optical unit (imaging optical system) 6 (6) for the scanners Y and M (C and K) has a condensing function and an fθ characteristic. The imaging optical unit 6 (6) includes at least one imaging optical element and at least one light beam reflection unit, which are disposed on the respective optical paths of the plurality of light beams which are deflected for scanning by the optical deflector 5, respectively. The imaging optical elements and the light beam reflection units allow the plurality of light beams to be imaged on a plurality of different surfaces to be scanned.

The imaging optical unit 6 (6) of the scanners Y and M (C and K) according to this embodiment includes a first imaging lens 6a (6a) as a first imaging optical element and second imaging lenses 6b (6b) as second imaging optical elements, which are each made of a plastic material.

The first imaging lens 6a (6a) is shared by the two scanners Y and M (C and K).

Further, the imaging optical unit 6 (6) of the scanner Y (K) includes one reflector mirror 8d (8d) as the light beam reflection unit. Further, the imaging optical unit 6 (6) of the scanner M (C) includes three reflector mirrors 8a, 8b, and 8c (8a, 8b, and 8c) as the light beam reflection units.

The reflector mirrors 8a, 8b, 8c, and 8d (8a, 8b, 8c, and 8d) according to this embodiment are formed of plane mirrors, and turn light beams that have passed through the first and second imaging lenses 6a and 6b (6a and 6b) toward corresponding photosensitive drum surfaces 7a and 7b (7c and 7d), respectively. The reflector mirrors 8a, 8b, 8c, and 8d (8a, 8b, 8c, and 8d) may each have power within the main scanning section or the sub scanning section.

The imaging optical unit 6 (6) images, in spots, light beams based on image information and deflected for scanning by the optical deflector 5, on the photosensitive drum surfaces 7a and 7b (7c and 7d) serving as the surfaces to be scanned, which are described later, within the main scanning section. In addition, the imaging optical unit 6 (6) has an optical face tangle error correction function achieved by providing an optical conjugate relationship between a deflection surface 5a (5a) of the optical deflector 5 and the photosensitive drum surfaces 7a and 7b (7c and 7d) within the sub scanning section.

The imaging optical unit 6 (6) may include three or more imaging optical elements (imaging lenses).

The photosensitive drum 7 is a recording medium, and the photosensitive drum surfaces (surfaces to be scanned) 7a, 7b, 7c, and 7d are recording media for Y, M, C, and K in the stated order, respectively.

A light blocking member 10 (10) within the first (second) scanning unit U1 (U2) blocks undesirable light (flare light, ghost light, etc.) reflected by the imaging lens surface of the first and second imaging lenses 6a and 6b (6a and 6b), and allows the light beam deflected for scanning by the optical deflector 5 to pass therethrough.

In this embodiment, as illustrated in FIG. 1, the first and second scanning units U1 and U2 are disposed (opposed) symmetrically with respect to the rotating axis of the optical deflector 5 on both sides thereof two by two to provide the opposed scanning unit. As a result, there is configured an optical scanning apparatus installable in the color image forming apparatus of four colors (Y, M, C, and K).

In the first scanning unit U1, two light beams emitted from two light source units (not shown) are allowed to obliquely enter the same deflection surface 5a of the optical deflector 5 at an oblique incident angle γ from downward and upward directions of the optical reference axis C0 within the sub scanning section.

In the second scanning unit U2, two light beams emitted from two light source units (not shown) are allowed to obliquely enter the same deflection surface 5a of the optical deflector 5 at an oblique incident angle γ from downward and upward directions of the optical reference axis C0 within the sub scanning section.

Then, the light beam downward-obliquely entering the deflection surface 5a (5a) is reflected thereon and emitted therefrom downward-obliquely, and the light beam upward-obliquely entering the deflection surface 5a (5a) is reflected thereon and emitted therefrom upward-obliquely. Thus, the optical paths are divided through the corresponding reflector mirrors 8a, 8b, 8c, and 8d (8a, 8b, 8c, and 8d) by the imaging optical unit 6 (6).

The four divided optical beams are guided onto the corresponding photosensitive drum surfaces (surfaces to be scanned) 7a, 7b, 7c, and 7d to form a color image.

Thus, in FIG. 1, the first and second scanning units U1 and U2 are disposed so as to share the optical deflector 5 of the scanning units U1 and U2 as described above. A plurality of light beams from the plurality of scanning units U1 and U2 are guided to the deflection surfaces 5a and 5b of the light deflector 5, which are different from each other, for the scanning units U1 and U2, respectively. The plurality of light beams in the respective scanning units U1 and U2 are allowed to enter the photosensitive drum surfaces 7a, 7b, 7c, and 7d different from each other to form a color image.

Further, in this embodiment, because both of the two light beams deflected for scanning by the same deflection surface 5a (5a) pass through the first imaging lens 6a (6a), the imaging optical unit 6 (6) is configured with the reduced number of imaging lenses, thereby enabling the apparatus to be downsized.

Figure 2:
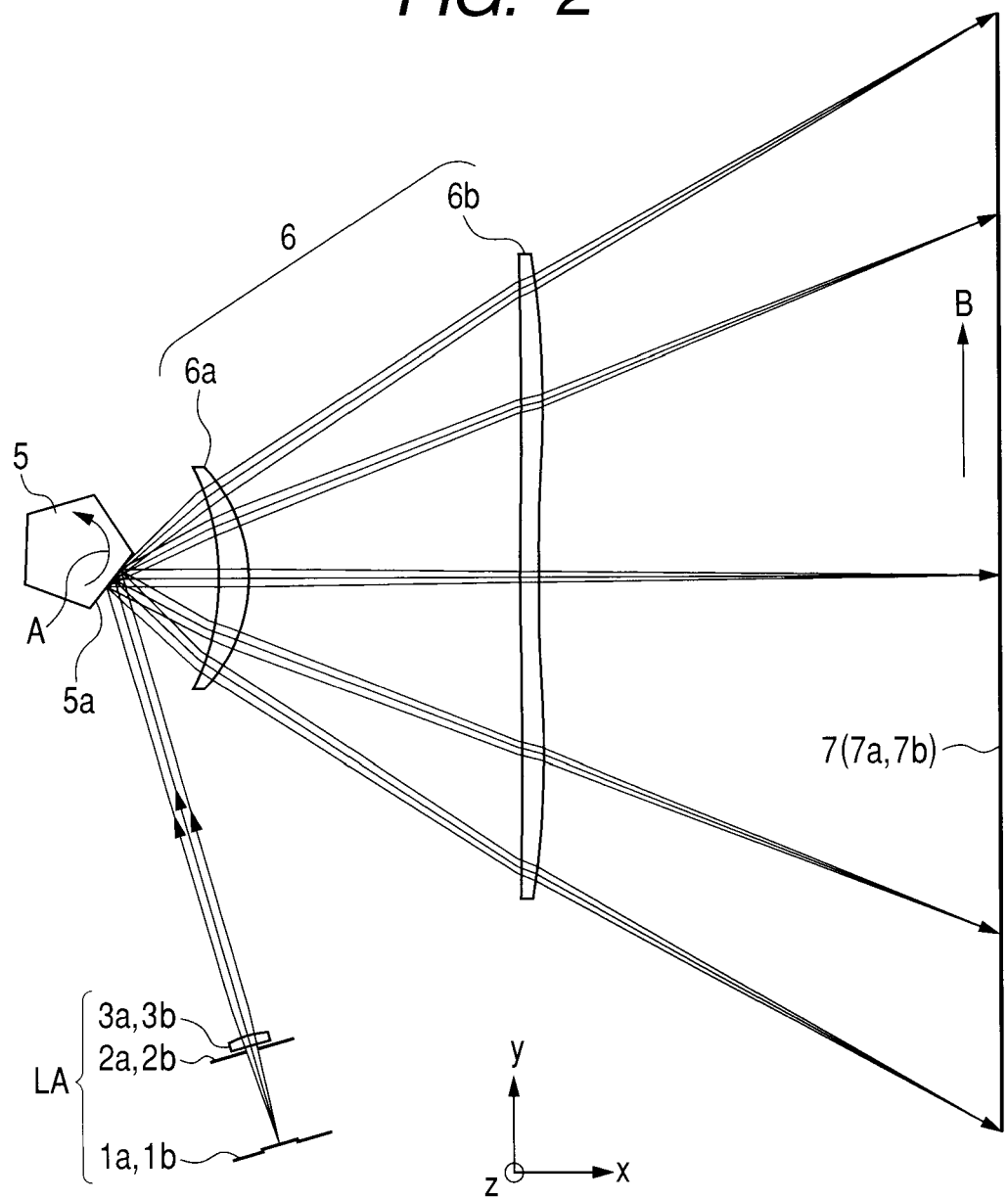
FIG. 2 is a cross-sectional view of the optical scanning apparatus taken along a main scanning direction according to the first embodiment of the present invention.

FIG. 2 is a main portion sectional view in the main scanning direction (main scanning sectional view), of the first scanning unit U1 illustrated in FIG. 1, in which an optical path is spread out. In FIG. 2, the light blocking member and the reflector mirror illustrated in FIG. 1 are omitted.

FIG. 2 illustrates only the first scanning unit U1. The second scanning unit U2 is similar in configuration and optical operation to the first scanning unit U1.

In FIG. 2, light source units 1a and 1b is constituted by a semiconductor laser.

An aperture stops 2a and 2b shape a diverged light beam emitted from a plurality of light source units 1a and 1b into respective specific beam shapes. Condenser lenses (anamorphotic lenses) 3a and 3b have respective different refractive powers (powers) between the main scanning direction (in main scanning section) and the sub scanning direction (in sub scanning section). Thus, the diverged light beam having passed through the aperture stops 2a and 2b is converted into a parallel light beam (or converged light beam) in the main scanning direction, and into a converged light beam in the sub scanning direction.

The elements such as the light source units 1a and 1b, aperture stops 2a and 2b, and condensing lenses 3a and 3b each configure one element of the incident optical system LA.

The incident optical system LA guides the plurality of light beams emitted from the plurality of light source units 1a, 1b to the same deflection surface 5a of the deflection unit 5 with angles different from one another within the sub scanning section.

Two optical elements (collimator lens and cylinder lens) may constitute the condenser lens 3a or 3b. The condenser lenses 3a and 3b may be integrated with each other.

The optical deflector 5 serving as a deflection unit is constituted by a five-surface polygon mirror (rotational polygon mirror) having a circumcircle of a diameter of 34 mm, and is rotated at a fixed speed (equi-angular speed) in an arrow direction A of FIG. 2 by a motor as a driving unit (not shown).

The imaging optical system 6 has a condensing function and fθ characteristics described later. In this embodiment, the imaging optical system 6 includes first and second imaging lenses (also referred to as imaging lens) 6a and 6b which are imaging optical elements having different powers between the main scanning direction (in main scanning section) and the sub scanning direction (in sub scanning section).

In this embodiment, the first and second imaging lenses 6a and 6b are made of plastic materials, and cause a plurality of light beams based on image information and deflected for scanning by the same deflecting surface 5a of the optical deflector 5 to form an image on the photosensitive drum surfaces 7a and 7b each serving as a surface to be scanned. By setting a conjugate relationship between the deflecting surface 5a of the optical deflector 5 and the photosensitive drum surfaces 7a and 7b in the sub scanning section, the first and second imaging lenses 6a and 6b correct the optical face tangle error of the deflecting surface 5a.

The first imaging lens 6a has positive powers in the main and sub scanning sections on the optical axis of the first imaging lens 6a.

The second imaging lens 6b has a negative power in the main scanning section and a positive power in the sub scanning section on the optical axis of the second imaging lens 6b.

The fθ characteristics mean a relationship where an image of a light beam entering at a field angle (scanning angle) θ is formed a on an image plane (surfaces 7a and 7b to be scanned) at a position of height Y from an optical axis where Y=f×θ, f denoting a constant. In other words, the fθ characteristics mean characteristics where scanning widths (scanning speeds) scanned per unit field angle are constant on the entire region of the scanning surface. The constant f is referred to as fθ coefficient. When light beams incident on the imaging optical system 6 are parallel light beams, the constant f is equal in value to a paraxial focal length f of the imaging optical system 6.

The photosensitive drum surfaces 7a, 7b of the photosensitive drum 7 each function as a surface to be scanned.

In this embodiment, two diverged light beams having been optically modulated and emitted from the two light source units 1a and 1b according to image information are regulated by the corresponding aperture stops 2a and 2b, and then are incident on the condensing lenses 3a and 3b. The light beams having entered the condensing lenses 3a and 3b are emitted from the condensing lenses 3a and 3b as parallel light beams within the main scanning section.

Further, within the sub scanning section, the light beams are converged and imaged on the same deflection surface 5a of the optical deflector 5 with angles different from each other as linear images (linear images elongated in the main scanning direction). Then, two light beams deflected for scanning on the deflection surface 5a of the optical deflector 5 are imaged, in spots, on the photosensitive drum surfaces 7a and 7b different from each other, through the first and second imaging lenses 6a and 6b.

Then, the light beam emitted from the light source unit 1a downward-obliquely enters the deflection surface 5a of the optical deflector 5 in the sub scanning section and then is reflected thereon and emitted therefrom downward-obliquely in the sub scanning section. The light beam emitted from the light source unit 1b upward-obliquely enters the deflection surface 5a in the sub scanning section and then is reflected thereon and emitted therefrom upward-obliquely in the sub scanning section.

Then, by rotating the optical deflector 5 in the arrow direction A, the photosensitive drum surfaces 7a and 7b are optically scanned in an arrow direction B (main scanning direction). Thus, an image is recorded on the photosensitive drum surfaces 7a and 7b each serving as a recording medium.

In this embodiment, presuming that a printing width equal to an A3 size (ISO 216) is scanned, an effective scanning width of the surface 7 to be scanned is set to 310 mm to configure an optical system. However, the present invention is not limited to this size, and may deal with larger or smaller sizes.

In this embodiment, shapes of refractive surfaces of the first and second imaging lenses (scanning lenses) 6a and 6b are represented by the following expression. Assume that an origin is set at an intersection point with an optical axis, the direction of the optical axis is set as an X-axis, an axis orthogonal to the optical axis with respect to the main scanning surface is set as a Y-axis, and an axis orthogonal to the optical axis with respect to the sub scanning surface is set as a Z-axis. In this case, the shape of the refractive surface in a meridian line direction corresponding to the main scanning direction is expressed by the following expression.

$$X = \frac{Y^2/R}{1+\left(\frac{1-(1+K)}{(Y/R)^2}\right)^{1/2}} + B_4Y^4 + B_6Y^6 + B_8Y^8 + B_{10}Y^{10} \quad (a)$$

(where R denotes a curvature radius of the meridian line on the optical axis and K, $B_4$, $B_6$, $B_8$, and $B_{10}$ denote aspherical coefficients).

The shape of the refractive surface in a sagittal line direction corresponding to the sub scanning direction (direction including an optical axis, which is orthogonal to the main scanning direction) is expressed by the following expression.

$$S = \frac{Z^2/r'}{1+(1-(Z/r'))^{1/2}} \quad (b)$$

Here, a curvature radius (sagittal line curvature radius) r' with respect to the sub scanning direction at a position separated from the optical axis by a distance Y in the main scanning direction is represented by the following expression.

$$r' = r_0(1+D_2Y^2+D_4Y^4+D_6Y^6+D_8Y^8+D_{10}Y^{10})$$

(where $r_0$ denotes the sagittal line curvature radius on the optical axis, and $D_2$, $D_4$, $D_6$, $D_8$, and $D_{10}$ denote coefficients).

The sagittal line curvature radius r' at an off-axial position is defined in a plane including a normal line of a meridian line of each position and perpendicular to the main scanning cross section. A polynomial expression of the shape expression is represented by a function up to the tenth order. However, a greater or smaller order may also be used. As long as an expression representing a surface shape has an equal surface representing freedom, effects of the present invention may be obtained without any problems.

Tables 1 and 2 illustrate an optical arrangement of the optical elements and numerical values of surface shapes of the imaging optical elements (imaging lenses) according to this embodiment. In Table 2, a first surface is an incident surface of the first imaging lens 6a, a second surface is an exit surface of the first imaging lens 6a, a third surface is an incident surface of the second imaging lens, and a fourth surface is an exit surface of the second imaging lens. Further, E-x indicates $10^{-x}$.

Aspherical coefficients B4u to B10u and D2u to D10u specify shapes of the surface on an opposite side of the light source unit 1 with respect to the optical axis in the main scanning and sub scanning sections, respectively. Aspherical coefficients B41 to B101 and D21 to D101 specify shapes of the surfaces on the side of the light source unit 1 with respect to the optical axis in the main scanning and sub scanning sections, respectively.

In this embodiment, a light beam emitted from the light source units 1a and 1b enters the deflecting surface 5a of the optical deflector 5 at an angle with respect to the optical axis of the imaging optical system 6 in the main scanning section. Thus, a movement of the deflection surface in the optical axis direction (sag) accompanied by the rotation of the optical deflector 5 occurs asymmetrically between a scanning start side and a scanning end side.

The asymmetrical sag causes an asymmetrical change in field curvature or in variation of spot diameter in the main scanning direction with respect to the optical axis. In order to excellently compensate for the asymmetrical change, the first and second imaging lenses 6a and 6b both have surfaces where curvature radiuses in the sub scanning direction asymmetrically change with respect to the optical axis along the main scanning direction.

In the second, third and fourth surfaces, aspherical coefficients D2u to D10u and D21 to D101 are different in the sub scanning section, clearly exhibiting that an in the curvature in the sub scanning section changes asymmetrically with respect to the optical axis, from on-axis to off-axis in an effective diameter of the lens surface.

TABLE 1

| Scanning system data | | |
|---|---|---|
| oblique incident angle in sub scanning direction (°) | Y | 3 |
| fθ coefficient (mm/rad) | f | 210 |
| used wavelength (nm) | λ | 790 |
| refractive index of scanning lens | N | 1.523972 |
| maximum deflection angle (°) | θmax | 42.2 |
| Interval between deflection point and scanning lens R1 surface (mm) | D1 | 29.5 |
| Interval between scanning lens R1 surface and scanning lens R2 surface (mm) | D2 | 8 |
| Interval between scanning lens R2 surface and scanning lens R3 surface (mm) | D3 | 76.0 |
| Interval between scanning lens R3 surface and scanning lens R4 surface (mm) | D4 | 5.0 |
| Interval between scanning lens R4 surface and surface to be scanned (mm) | D5 | 130.1 |
| Interval between deflection point and surface to be scanned (mm) | D | 248.6 |

TABLE 2

Scanning lens shape

|       | First surface | Second surface | Third surface | Fourth surface |
|-------|---------------|----------------|---------------|----------------|
| R     | −6.16E+01     | −3.94E+01      | 1.55E+03      | 3.85E+02       |
| K     | −8.75E+00     | −2.32E+00      | −3.57E+03     | −1.08E+02      |
| B4u   | −1.75E−06     | −2.08E−06      | −3.04E−08     | −2.16E−07      |
| B6u   | 3.21E−09      | 1.51E−09       |               | 1.74E−11       |
| B8u   | −3.26E−12     | −6.25E−13      |               | −1.23E−15      |
| B10u  | 1.09E−15      | −2.27E−16      |               | 3.51E−20       |
| B4l   | −1.75E−06     | −2.08E−06      | −3.04E−08     | −2.16E−07      |
| B6l   | 3.21E−09      | 1.51E−09       |               | 1.74E−11       |
| B8l   | −3.26E−12     | −6.25E−13      |               | −1.23E−15      |
| B10l  | 1.09E−15      | −2.27E−16      |               | 3.51E−20       |
| r     | 1.20E+02      | −3.80E+01      | 1.95E+02      | −4.78E+01      |
| D2u   |               | 5.69E−05       | −6.16E−05     | 1.02E−04       |
| D4u   |               | 1.72E−07       | −5.50E−09     | −1.33E−08      |
| D6u   |               |                | 7.29E−13      | 3.92E−12       |
| D8u   |               |                | −3.80E−17     | −4.75E−16      |
| D10u  |               |                | 1.95E−21      | 4.03E−20       |
| D2l   |               | 3.53E−05       | −6.16E−05     | 1.02E−04       |
| D4l   |               | 1.55E−07       | −5.50E−09     | −1.51E−08      |
| D6l   |               |                | 7.29E−13      | 4.30E−12       |
| D8l   |               |                | −3.80E−17     | −5.11E−16      |
| D10l  |               |                | 1.95E−21      | 4.00E−20       |

In this embodiment, the incident surface (first surface) and the exit surface (second surface) of the first imaging lens 6a have aspherical (noncircular-arc) shapes represented by a function up to a tenth order in the main scanning section (main scanning direction). In the sub scanning section (sub scanning direction), the incident surface (first surface) thereof has a spherical shape, and the exit surface (second surface) thereof has a spherical shape where a curvature changes in the main scanning direction.

The incident surface (third surface) and the exit surface (fourth surface) of the second imaging lens 6b have aspherical (noncircular-arc) shapes represented by a function up to a tenth order in the main scanning section. In the sub scanning section (sub scanning direction), the incident surface (third surface) thereof and the exit surface (fourth surface) thereof are both formed into spherical shapes where curvatures change in the main scanning direction. The power in the sub scanning section reduces from on-axis to out-of-axis in the main scanning direction so that a field curvature is adjusted successfully in the sub scanning direction.

In this embodiment, the first and second imaging lenses 6a and 6b are made of plastic materials (resins) as described above. However, the materials are not limited to plastic materials, and glass materials may be used.

Figure 3:
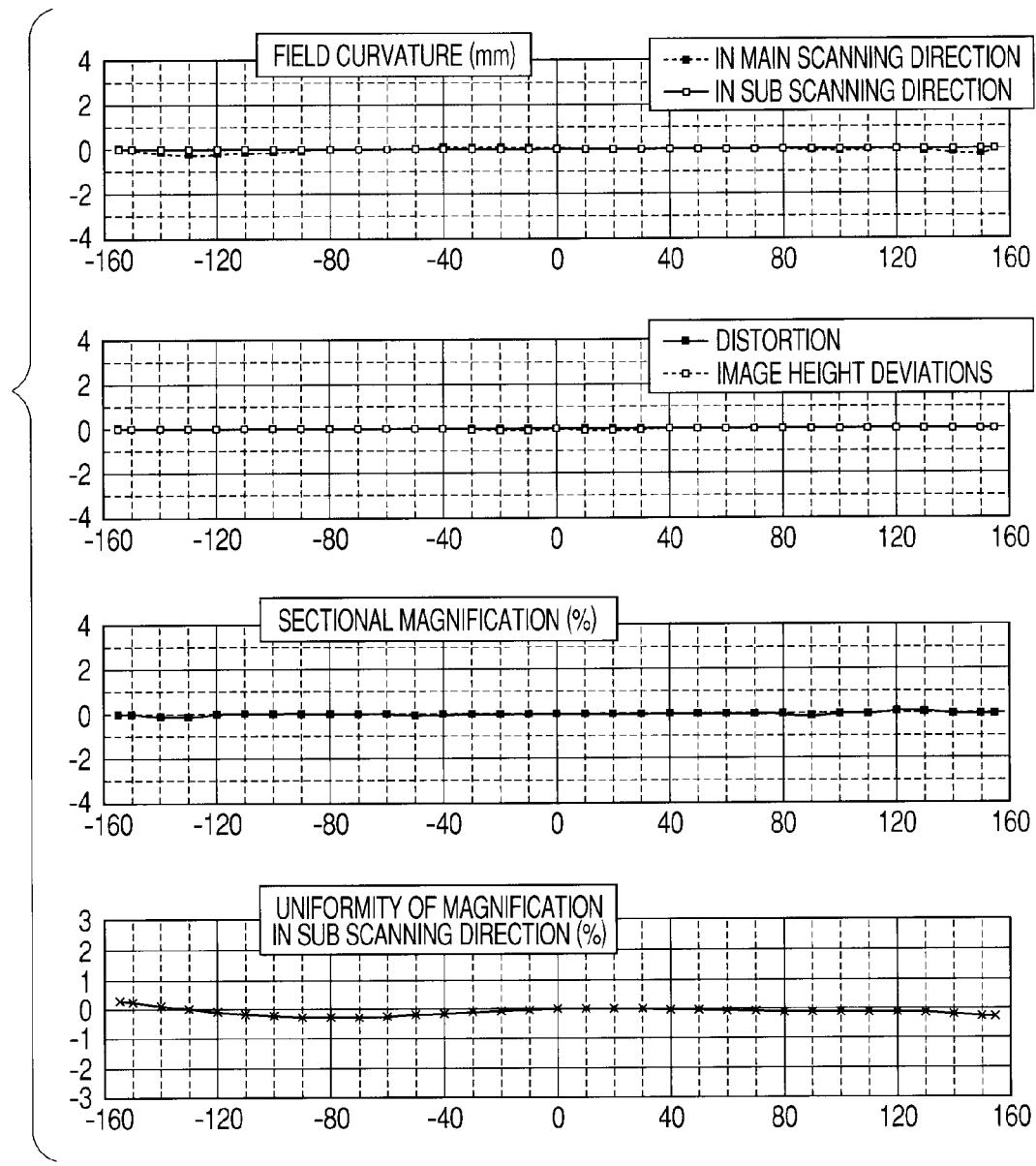
FIG. 3 is a graph illustrating a geometrical aberration and a uniformity of magnification in the sub scanning direction according to the first embodiment of the present invention.

FIG. 3 illustrates geometrical aberration of this embodiment.

Referring to FIG. 3, each aberration is adjusted to a level of no practical problem. A variation in magnification in the sub scanning direction depending on an image height is suppressed to 2% or less. Thus, a variation in a spot shape in the sub scanning direction depending on the image height is suppressed, which attains high imaging performance. A variation in magnification in the sub scanning direction depending on the image height may preferably be limited to 10% or less, more preferably 5% or less.

Figure 4:
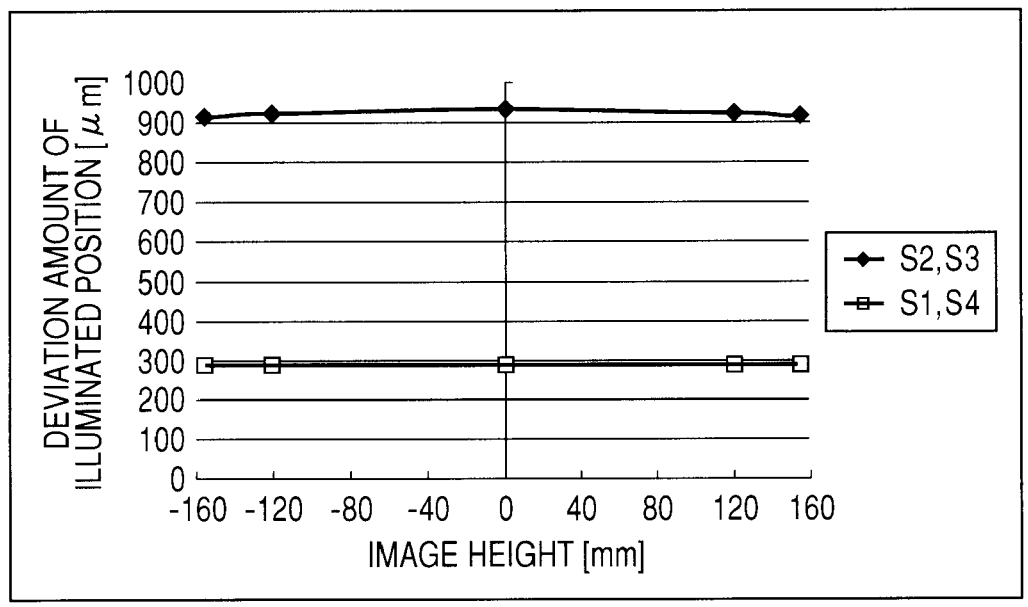
FIG. 4 is a diagram illustrating a deviation amount of an illuminated position due to a rotation eccentricity of a reflector mirror according to the first embodiment of the present invention.
Figure 5:
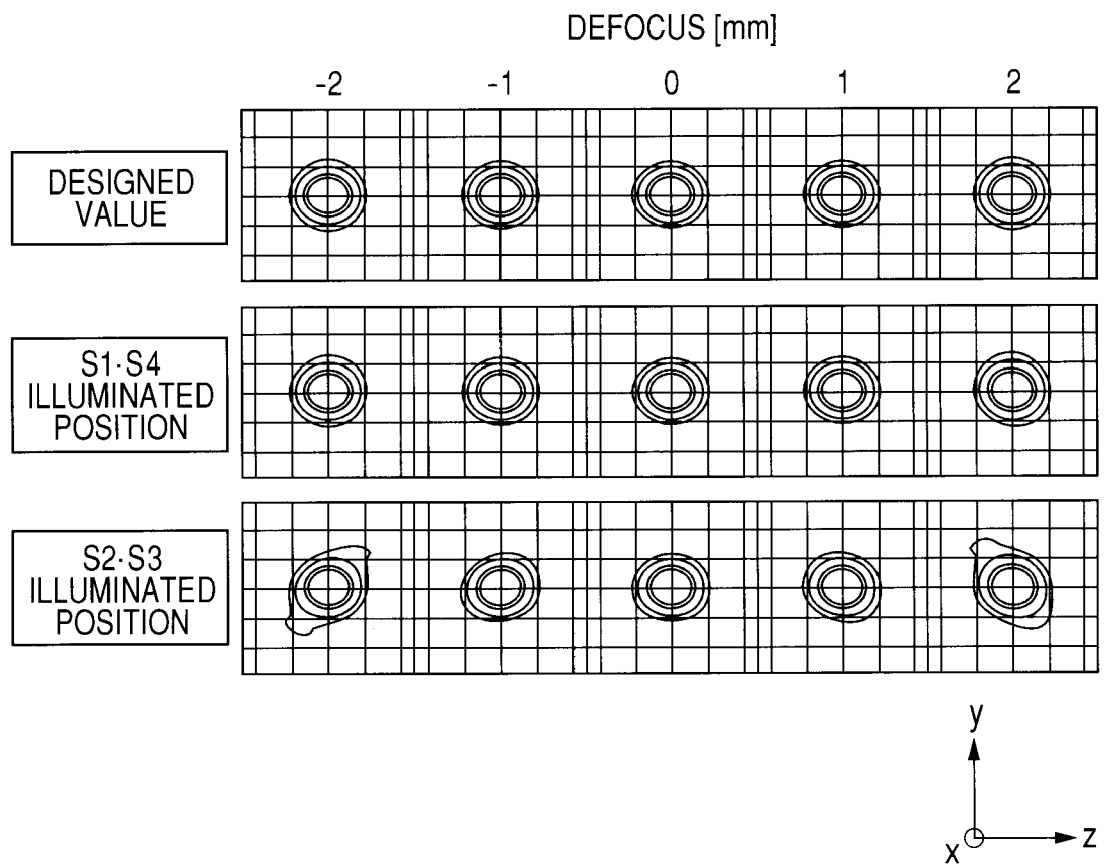
FIG. 5 is a diagram illustrating a deterioration of an imaging spot due to a parallel eccentricity of an imaging lens according to the first embodiment of the present invention.

Next, referring to FIGS. 1, 4, and 5, means and effects for achieving the object of this embodiment are described.

In this embodiment, as described above, the optical deflector 5 is shared by the right and left scanning units U1 and U2 to realize the downsized optical scanning apparatus. The scanning units U1 and U2 are disposed (opposed) symmetrically with respect to the rotating axis of the optical deflector 5 on both sides thereof to provide a so-called opposed scanning unit (opposed scanning optical unit), to thereby configuring an optical image forming apparatus that may be provided to the color image forming apparatus of four colors (Y, M, C, and B). Further, three reflector mirrors are disposed in each of the optical paths S2 and S3, to thereby realize optical scanning apparatus thinned in size.

In the color image forming apparatus as described above, the plurality of scanning lines are superimposed on one another to form an image. For this reason, it is particularly important to reduce the misalignment of the scanning lines between the respective colors.

At the time of manufacturing the optical scanning apparatus, there is a case in which the reflector mirrors 8a, 8b, 8c, and 8d are rotated (eccentrically rotated) in the sub scanning direction due to an assembly tolerance caused by an insufficient precision of a reflector mirror holding portion of an optical box that receives the above-mentioned optical members.

In such a case, the light beam that is deflected for scanning by the optical deflector, passes through the imaging lens, and arrives at the photosensitive drum along the optical path turned by the reflective mirror is displaced from a given position in the sub scanning direction when applied on the photosensitive drum.

Likewise, when the incident optical unit, the deflection surface of the optical deflector, and the imaging lens are made eccentric in the sub scanning direction, the light beam arrives at the photosensitive drum at a position displaced from the given position in the sub scanning direction.

In the case of an optical path, such as the optical path S2 or the optical path S3, in which a plurality of reflector mirrors are disposed, the assembly tolerance of the plurality of reflection mirrors are accumulated, to thereby increase the variation of the scanning lines to a large amount.

FIG. 4 is a diagram illustrating a deviation amount of an illuminated position when the reflector mirror is eccentrically rotated.

In this embodiment, as illustrated in FIG. 4, when the reflector mirrors 8a to 8d (8a to 8d) are each eccentrically rotated in the sub scanning direction by 5 arc-minutes, the scanning line on the photosensitive drum surface is deviated in the optical path S1 (S4) by 290 μm whereas the scanning line is deviated in the optical path S2 (S3) by about 920 μm.

Under the circumstances, in this embodiment, for the purpose of reducing the misalignment of the scanning lines between the respective colors, the illuminated position of the light beam which is applied on the surface to be scanned, is adjusted as follows on the surface to be scanned in the sub scanning direction.

That is, in the optical path S2 (S3) having the reflector mirrors disposed therein highest in number among the plurality of optical paths S1 to S4 which are guided to the plurality of surfaces to be scanned, the reflector mirror 8c (8c) disposed optically closest to the surface to be scanned 7b (7c) is eccentrically rotated in the sub scanning direction (directed by an arrow A of FIG. 1). With this configuration, in this embodiment, the scanning line on the surface to be scanned 7b (7c) may be adjusted to a given position.

Even when the reflector mirror 8c (8c) disposed at a position optically closest to the surface to be scanned 7b (7b) in the optical path is eccentrically rotated in the sub scanning direction, the imaging performance of the light beam is not deteriorated. Accordingly, in the optical path S2 (S3), there arises no problem even if the reflector mirror 8c (8c) is eccentrically rotated greatly in the sub scanning direction in order to adjust the significantly deviated scanning line position in the optical path S2 (S3).

The reflector mirrors 8a and 8b (8a and 8b) are disposed in front of the second imaging lens 6b (6b) (on the optical deflector 5 side) in the optical path S2 (S3). For this reason, when the reflector mirrors 8a and 8b (8a and 8b) are eccentrically rotated in the sub scanning direction to adjust the position of the scanning line, the passing position of the light beam within the second imaging lens 6b (6b) is deviated. As a result, the imaging spot on the surface 7b (7c) to be scanned is deteriorated, which is not preferable. For the same reason, it is not preferable that the second imaging lens 6b (6b) be eccentrically parallelized in the sub scanning direction.

Further, because the reflector mirror 8c (8c) is disposed at a position closest to the surface to be scanned 7b (7b) in the optical path S2 (S3), a peripheral space of the reflector mirror 8c (8c) is large, which provides easy access to the reflector mirror 8c (8c) when assembling, with the result that a rotation eccentricity mechanism of the reflector mirror may be easily provided.

Further, because the second imaging lens 6b (6b) in the optical path S2 (S3) is fixed at a given position, the undesirable light reflected by the imaging lens surface is blocked by the light blocking member 10 (10) without being deviated in the sub scanning direction, and hence does not reach the photosensitive drum.

On the other hand, in the optical path S1 (S4) other than the optical path S2 (S3) in which the largest number of reflector mirrors are disposed among the optical paths, the second imaging lens 6b (6b) optically closest to the surface to be scanned is eccentrically parallelized in the sub scanning direction (an arrow B in FIG. 1). As a result, in this embodiment, the scanning line on the surface to be scanned 7a (7d) may be adjusted to a given position.

FIG. 5 is a diagram illustrating an imaging spot deteriorated on the photosensitive drum surface when the second imaging lens 6b (6b) in the optical path S1 (S4) is eccentrically parallelized.

As illustrated in FIG. 5, in an optical path such as the optical path S2 (S3) where the deviation amount of the illuminated position is large, and the amount of parallel eccentricity of the second imaging lens 6b (6b) for adjusting the illuminated position is increased, the imaging spot on the photosensitive drum surface 7b (7c) is deteriorated. Further, a depth width by which the diameter of the imaging spot on the photosensitive drum surface 7b (7c) is held to a given value or smaller is reduced. As a result, it is difficult to form a high-quality color image.

However, because only one reflector mirror is disposed in the optical path in the optical path S1 (S4), a positional deviation of the scanning line on the photosensitive drum surface 7a (7d) in the sub scanning direction due to the rotation eccentricity in the sub scanning direction caused by the insufficient precision in assembling the reflector mirror is slight as illustrated in FIG. 4.

Because the positional deviation of the scanning line on the photosensitive drum surface 7a (7d) in the sub scanning direction is slight, the amount of parallel eccentricity of the second imaging lens 6b (6b) in the sub scanning direction for adjustment is small. Further, the imaging spot does not deteriorate even if the illuminated position is adjusted by eccentrically parallelizing the second imaging lens 6b (6b) in the sub scanning direction.

The second imaging lens 6b (6b) in the optical path S1 (S4) is adhesively fixed with an ultraviolet curing agent after the second imaging lens 6b (6b) has been moved for adjusting the illuminated position by an adjuster of the optical scanning apparatus. For this reason, there is no need to provide an adjusting mechanism within the optical housing, and a downsized optical scanning apparatus may be provided.

Further, because a travel distance of the second imaging lens 6b (6b) in the sub scanning direction is slight, the undesirable light originated by the reflection on the imaging lens surface is also slight in the travel distance in the sub scanning direction. Therefore, because the undesirable light may be sufficiently blocked by the light blocking member, the undesirable light does not reach the photosensitive drum.

In this embodiment, it is assumed that, in the optical path S1 (S4) other than the optical path S2 (S3) in which the largest number of reflector mirrors are disposed among the optical paths, a power of the second imaging lens 6b (6b) optically closest to the surface to be scanned 7a (7d) on the optical axis within the sub scanning section is $\phi\_adj$. Further, it is assumed that a power of all the imaging lenses disposed in the same optical path (optical path S1 (S4)) on the optical axis within the sub scanning section is $\phi\_all$. In this case, the following condition is satisfied.

$$0.5 \times \phi\_all \leq \phi\_adj \leq 2 \times \phi\_all \quad (1)$$

When the power $\phi\_adj$ is less than the lower limit of the conditional expression (1), the sensitivity to the deviation of the illuminated position on the photosensitive drum surface 7a (7d) due to the parallel eccentricity of the second imaging lens 6b (6b) in the sub scanning direction is decreased. As a result, the amount of parallel eccentricity of the second imaging lens 6b (6b) for adjusting the illuminated position in the sub scanning direction becomes large, and the undesirable light originated by the reflection on the imaging lens surface greatly deviates in the sub scanning direction, and reaches the photosensitive drum, which is not therefore preferable.

When the power $\phi\_adj$ exceeds an upper limit of the conditional expression (1), the sensitivity to the deviation of the illuminated position on the photosensitive drum surface due to the parallel eccentricity of the second imaging lens 6b (6b) in the sub scanning direction is increased. As a result, the fine adjustment of the illuminated position becomes difficult, which is not therefore preferable.

In this embodiment, a power of the second imaging lens 6b (6b) in the optical path S1 (S4) on the optical axis within the sub scanning section is set as follows.

$$\phi\_adj=0.014$$

$$\phi\_all=0.012$$

In this case, the conditional expression (1) is satisfied.

It is more preferable to set the above-mentioned conditional expression (1) as follows.

$$0.7 \times \phi\_all \leq \phi\_adj \leq 1.8 \times \phi\_all \quad (1a)$$

In this embodiment, it is assumed that in the optical path S1 (S4) except for the optical paths in which the largest number of reflector mirrors are disposed among the optical paths, a differential value (variation) of the radius of curvature of the incident surface of the second imaging lens closest to the surface to be scanned within the sub scanning section in the effective scanning region with respect to the main scanning direction is $dr1/dY\_lens$. Further, it is assumed that a variation of the radius of curvature of the exit surface with respect to the main scanning direction is $dr2/dY\_lens$. In this case, the following conditions are satisfied.

$$0 \leq |dr1/dY\_lens| \leq 5 \quad (2)$$

$$0 \leq |dr2/dY\_lens| \leq 5 \quad (3)$$

When the variation exceeds at least one lower limit of the conditional expressions (2) and (3), the variation of the radius of curvature within the sub scanning section with respect to the main scanning direction is decreased, and the field curvature in the sub scanning direction may not be excellently corrected, which is not therefore preferable.

Further, when the variation exceeds at least one upper limit of the conditional expressions (2) and (3), the variation of the radius of curvature within the sub scanning section with respect to the main scanning direction is increased, which is not therefore preferable. Further, the sensitivity to the wave aberration due to the parallel eccentricity of the second imaging lens 6b (6b) in the sub scanning direction becomes high, and the imaging spot on the photosensitive drum surface is liable to be deteriorated, which is not therefore preferable.

Figure 6:
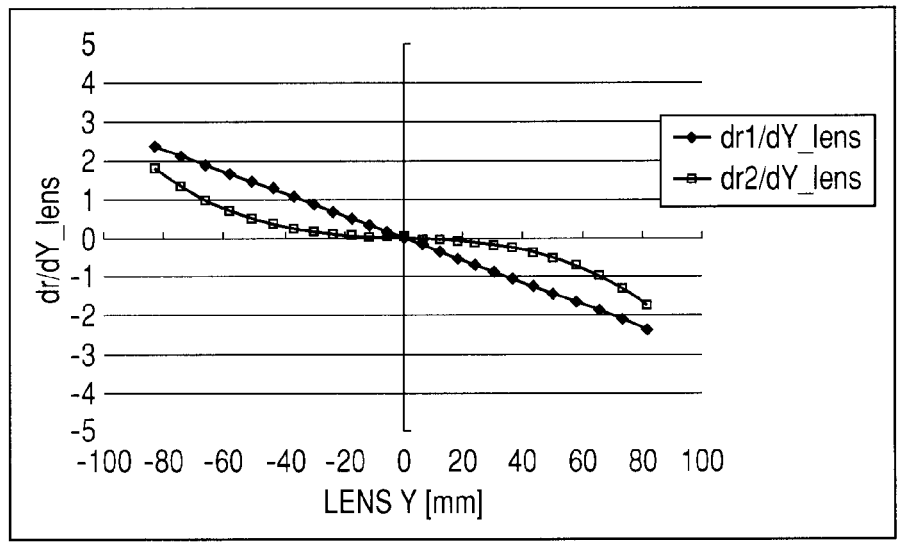
FIG. 6 is a diagram illustrating $dr/dY\_lens$ according to the first embodiment of the present invention.

In this embodiment, the variations of the radius curvatures of the incident surface and the exit surface of the second imaging lens 6b (6b) in the optical path S1 (S4) within the sub scanning section in the effective scanning region with respect to the main scanning direction are set as illustrated in FIG. 6, respectively. Those variations satisfy the conditional expressions (2) and (3).

It is more preferable to set the above-mentioned conditional expressions (2) and (3) as follows.

$$0 \leq |dr1/dY\_lens| \leq 4 \quad (2a)$$

$$0 \leq |dr2/dY\_lens| \leq 4 \quad (3a)$$

Thus, in this embodiment, in the simple illuminated position adjusting method as described above, the deterioration of the imaging spot shape on the surface to be scanned is suppressed, and the undesirable light is prevented from arriving at the surface to be scanned to form a high-quality image.

In this embodiment, the light source units 1a and 1b are each formed of a single light emitting portion, but the present invention is not limited to this configuration, and those light source units 1a and 1b may be each formed of a plurality of light emitting portions.

Further, in this embodiment, the imaging optical means 6 (6) is formed of two imaging lenses. However, the present invention is not limited to this configuration, and the imaging optical means 6 (6) may be formed of a plurality of imaging lenses.

Embodiment 2

Figure 7:
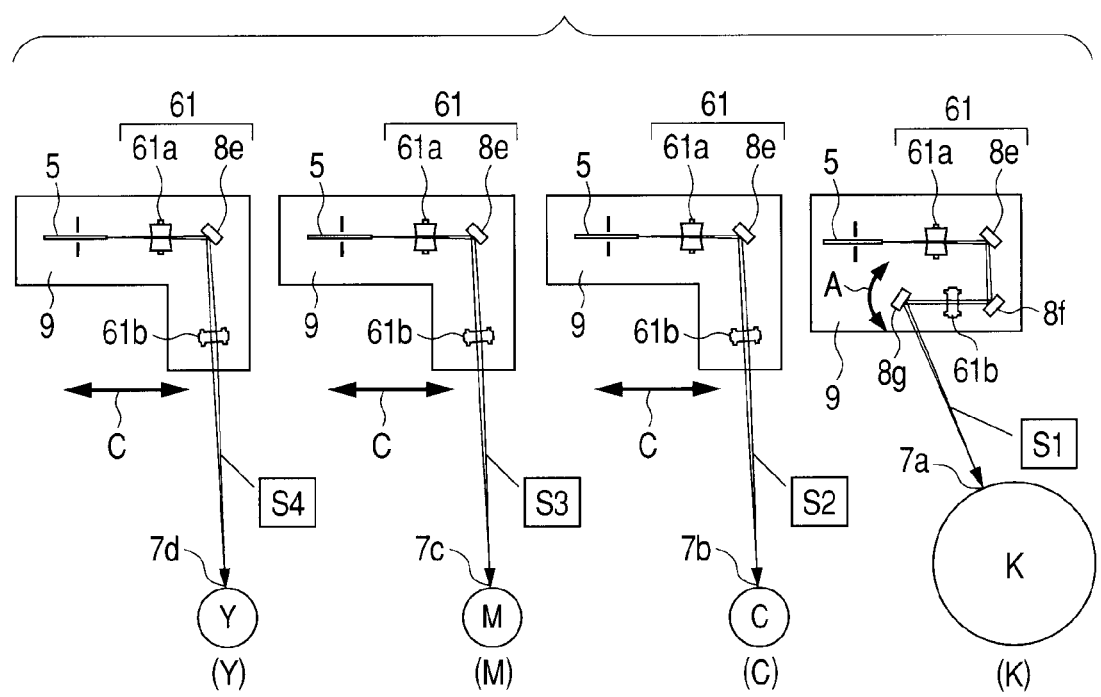
FIG. 7 is a cross-sectional view of an optical scanning apparatus taken along the sub scanning direction according to a second embodiment of the present invention.
Figure 8:
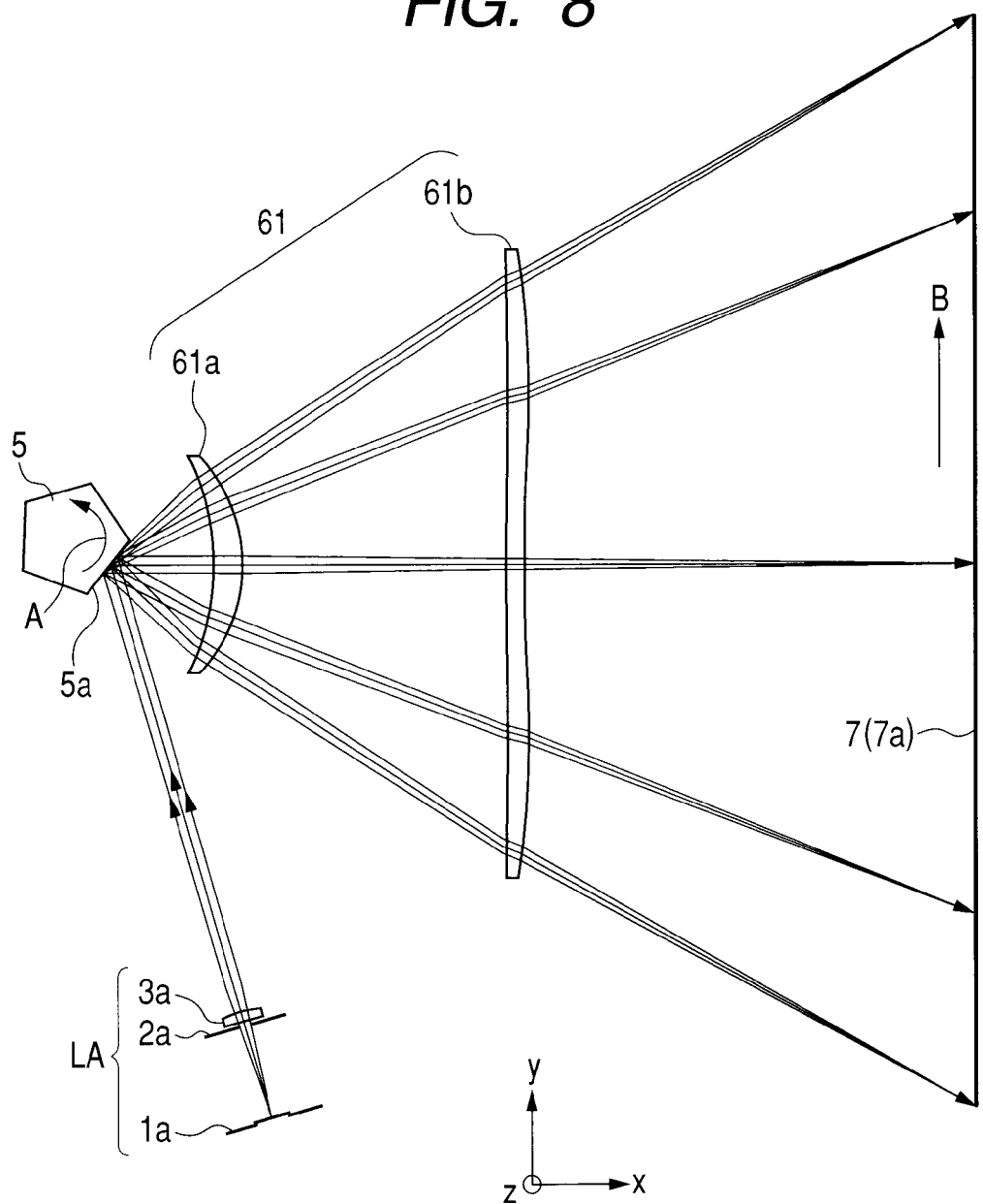
FIG. 8 is a cross-sectional view of the optical scanning apparatus taken along the main scanning direction according to the second embodiment of the present invention.

FIG. 7 is a cross-sectional view (sub scanning cross-sectional view) of a main portion in a sub scanning direction according to a second embodiment of the present invention. FIG. 8 is a cross-sectional view (main scanning cross-sectional view) of a main portion in a main scanning direction of a scanner K illustrated in FIG. 7, which illustrates a developed optical path. In FIGS. 7 and 8, the same elements as those illustrated in FIGS. 1 and 2 are denoted by identical reference numerals. In FIG. 8, the reflector mirror illustrated in FIG. 7 is omitted.

FIG. 8 illustrates only the scanner K, but the configurations of the other scanners C, M, and Y are identical with that of the scanner K except for the number of reflector mirrors.

In this embodiment, the difference from the above-mentioned first embodiment resides in that the optical deflector 5 is provided for each of the optical paths S1 to S4 (scanners). Further, in each of the optical paths S1 to S4 (scanners), at least parts of elements including the optical deflector 5 are housed in an optical housing 9 provided for each of the optical paths S1 to S4 (scanners).

Further, in the optical housing in which the largest number of reflector mirrors are disposed in an optical path extending from the optical deflector to the surface to be scanned, the reflector mirror 8g disposed closest to the surface to be scanned 9a is rotated in the sub scanning direction to adjust the illuminated position of the light beam on the surface to be scanned in the sub scanning direction.

Further, an optical housing except for the optical housing in which the largest number of reflector mirrors are disposed in an optical path extending from the optical deflector to the surface to be scanned is eccentrically parallelized in the sub scanning direction to adjust the illuminated position of the light beam on the surface to be scanned in the sub scanning direction. Other configurations and optical actions are identical with those in the first embodiment, thereby obtaining the same advantages.

That is, in this embodiment, with an aim to obtain higher definition in the color image forming apparatus, the optical deflector 5 is disposed in each of the plurality of optical paths S1 to S4, and at least parts of elements including the optical deflector 5 are housed in the optical housing 9 for each of the optical paths S1 to S4 (scanners). Further, the light beam is input to the deflection surface of the optical deflector 5 in the sub scanning direction with no angle (front incident), thereby changing the surface shape of the imaging lens.

Further, in the optical housing 9 in which the largest number of reflector mirrors are disposed in an optical path extending from the optical deflector to the surface to be scanned, the reflector mirror 8g disposed optically closest to the surface to be scanned 9a is rotated in the sub scanning direction (an arrow A in FIG. 7). With this arrangement, the illuminated position of the light beam on the surface to be scanned in the sub scanning direction is adjusted.

Further, the optical housing 9 except for the optical housing in which the largest number of reflector mirrors are disposed in the optical path extending from the optical deflector to the surface to be scanned is eccentrically parallelized in the sub scanning direction (an arrow C in FIG. 7) to adjust the illuminated position of the light beam on the surface to be scanned in the sub scanning direction.

In FIG. 7, a plurality of the optical housings 9 are disposed in each of the scanners K, C, M, and Y (optical paths) in this embodiment.

An imaging optical unit (imaging optical system) is disposed in each of the scanners K, C, M, and Y. Each of the imaging optical units 61 includes at least one imaging optical element and at least one light beam reflection unit, which are disposed on the optical path of a light beam deflected for scanning by each optical deflector 5, and image the light beam on the corresponding surfaces to be scanned 7a, 7b, 7c, and 7d.

The imaging optical unit 61 of the scanner K according to this embodiment includes a first imaging lens 61a as a first imaging optical element and second imaging lenses 61b as second imaging optical elements, both of which are made of a plastic material. Further, the imaging optical unit 61 of the scanner K includes three reflector mirrors 8e, 8f, and 8g as the light beam reflection unit.

Further, each imaging optical unit 61 of the scanners C, M, and Y in this embodiment includes the first imaging lens 61a as the first imaging optical element, and the second imaging lens 61b as the second imaging optical element, both of which are made of plastic material. Further, each imaging optical unit 61 of the scanners C, M, and Y includes one reflector mirror 8e as a light beam reflection unit.

The first imaging lens 61a of each of the scanners K, C, M, and Y has a positive power within the main scanning section and the sub scanning section on the optical axis of the first imaging lens 61a.

The second imaging lens 61b of each of the scanners K, C, M, and Y has a negative power within the main scanning section and a positive power within the sub scanning section on the optical axis of the second imaging lens.

The imaging optical unit 61 of each of the scanners K, C, M, and Y images the light beam based on image information deflected for scanning by the optical deflector 5 on the photosensitive drum surfaces 7a, 7b, 7c, and 7d serving as the surfaces to be scanned within the main scanning section in a spot. Further, the deflection surfaces of the optical deflectors 5 and the photosensitive drum surfaces 7a, 7b, 7c, and 7d optically satisfy a conjugate relationship therebetween to provide an optical face tangle error correction function.

Tables 3 and 4 illustrate numerical values of the optical arrangement of the optical elements and the surface shape of the imaging optical element (imaging lens) in this embodiment.

TABLE 3

Scanning system data

| | | |
|---|---|---|
| fθ coefficient (mm/rad) | f | 210 |
| used wavelength (nm) | λ | 790 |
| refractive index of scanning | N | 1.523972 |
| maximum deflection angle (°) | θmax | 42.2 |
| Interval between deflection point and scanning lens R1 surface (mm) | D1 | 29.5 |
| Interval between scanning lens R1 surface and scanning lens R2 surface (mm) | D2 | 8 |
| Interval between scanning lens R2 surface and scanning lens R3 surface (mm) | D3 | 76.0 |
| Interval between scanning lens R3 surface and scanning lens R4 surface (mm) | D4 | 5.0 |
| Interval between scanning lens R4 surface and surface to be scanned (mm) | D5 | 130.1 |
| Interval between deflection point and surface to be scanned (mm) | D | 248.6 |

TABLE 4

Scanning lens shape

| | First surface | Second surface | Third surface | Fourth surface |
|---|---|---|---|---|
| R | −6.16E+01 | −4.14E+01 | 1.55E+03 | 3.85E+02 |
| K | −8.75E+00 | 2.40E+05 | −3.57E+03 | −1.08E+02 |
| B4u | −1.75E−06 | −1.94E−06 | −3.04E−08 | −2.16E−07 |
| B6u | 3.21E−09 | 1.46E−09 | | 1.74E−11 |
| B8u | −3.26E−12 | −6.68E−13 | | −1.23E−15 |
| B10u | 1.09E−15 | −1.81E−16 | | 3.51E−20 |
| B4l | −1.75E−06 | −1.94E−06 | −3.04E−08 | −2.16E−07 |
| B6l | 3.21E−09 | 1.46E−09 | | 1.74E−11 |
| B8l | −3.26E−12 | −6.68E−13 | | −1.23E−15 |
| B10l | 1.09E−15 | −1.81E−16 | | 3.51E−20 |
| r | 1.20E+02 | −3.80E+01 | 1.95E+02 | −4.75E+01 |
| D2u | | 5.69E−05 | −6.16E−05 | 9.43E−05 |
| D4u | | 1.72E−07 | −5.50E−09 | −6.20E−09 |
| D6u | | | 7.29E−13 | 1.98E−12 |
| D8u | | | −3.80E−17 | −2.96E−16 |
| D10u | | | 1.95E−21 | 3.62E−20 |
| D2l | | 3.53E−05 | −6.16E−05 | 9.99E−05 |
| D4l | | 1.55E−07 | −5.50E−09 | −1.64E−08 |
| D6l | | | 7.29E−13 | 5.38E−12 |
| D8l | | | −3.80E−17 | −7.27E−16 |
| D10l | | | 1.95E−21 | 5.33E−20 |

In this embodiment, the incident surface (first surface) and the exit surface (second surface) of the first imaging lens 61a have aspherical (noncircular-arc) shapes represented by a function up to a tenth order in the main scanning section (main scanning direction). In the sub scanning section (sub scanning direction), the incident surface (first surface) thereof has a spherical shape, and the exit surface (second surface) thereof has a spherical shape where a curvature changes in the main scanning direction.

The incident surface (third surface) and the exit surface (fourth surface) of the second imaging lens 61b have aspherical (noncircular-arc) shapes represented by a function up to a tenth order in the main scanning section. In the sub scanning section (sub scanning direction), the incident surface (third surface) thereof and the exit surface (fourth surface) thereof are both formed into spherical shapes where curvatures change in the main scanning direction. The power in the sub scanning section reduces from on-axis to out-of-axis in the main scanning direction so that a field curvature is successfully adjusted in the sub scanning direction.

In this embodiment, the first and second imaging lenses 61a and 61b are made of plastic materials (resins) as described above. However, the materials are not limited to plastic materials, and glass materials may be used.

Figure 9:
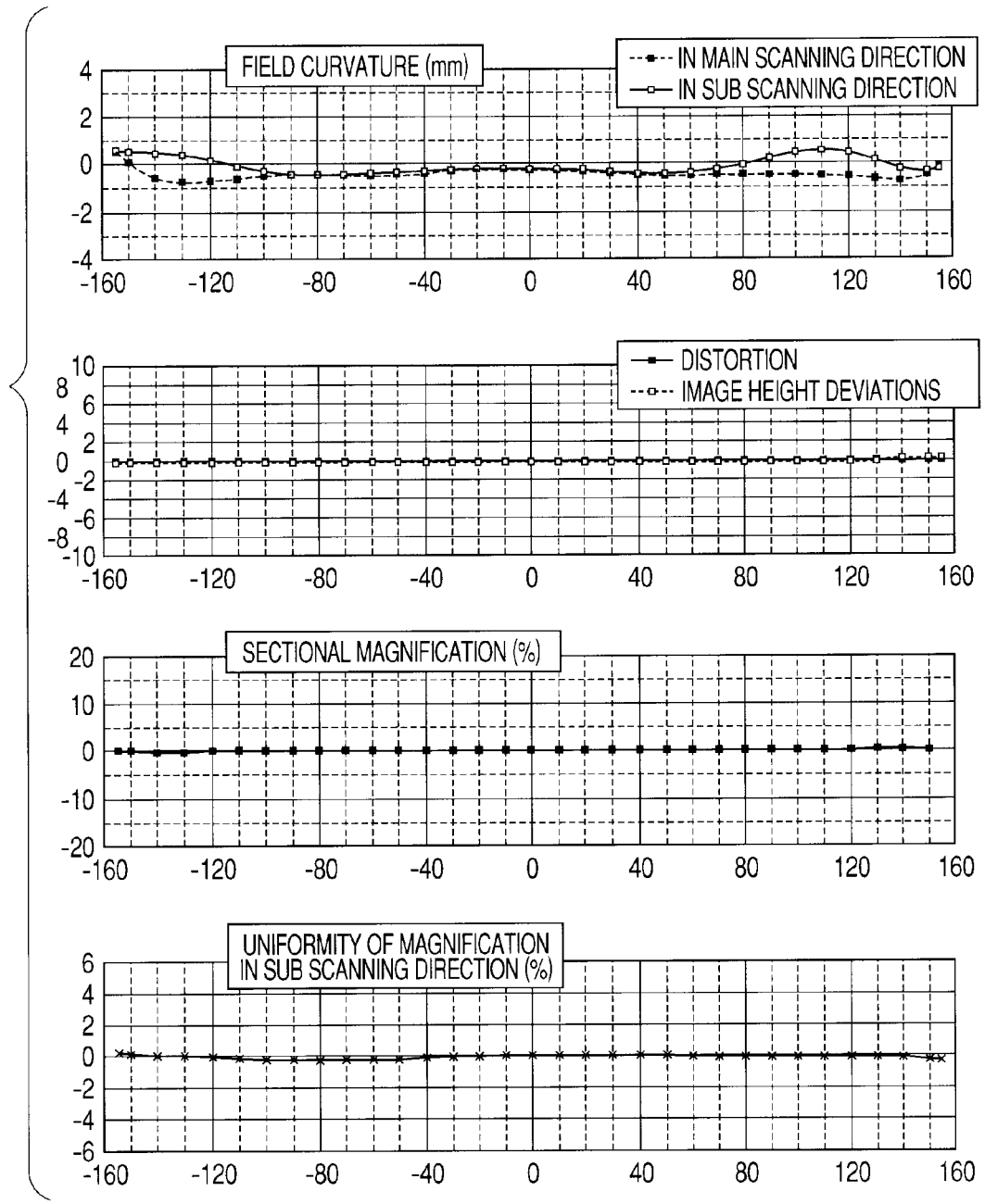
FIG. 9 is a graph illustrating a geometrical aberration and a uniformity of magnification in the sub scanning direction according to the second embodiment of the present invention.

FIG. 9 illustrates geometrical aberration of this embodiment.

Referring to FIG. 9, each aberration is adjusted to a level of no practical problem. A variation in magnification in the sub scanning direction depending on an image height is suppressed to 2% or less. Thus, a change in a spot shape in the sub scanning direction depending on the image height is suppressed, whereby high imaging performance may be obtained. A change in magnification in the sub scanning direction by the image height is preferably limited to 10% or less, more preferably 5% or less.

Referring to FIG. 7, means and effects for achieving the object of this embodiment are described.

In the color image forming apparatus in FIG. 7, the light beams output from corresponding light source units are made imaged on four photosensitive drum surfaces by using the above-mentioned four scanners.

In the optical path S1 that guides the light beam to the photosensitive drum surface 7a for K (black) color, three reflector mirrors 8e, 8f, and 8g are disposed to resolve a problem concerning the limit of space in the color image forming apparatus main body. In the optical paths S2, S3, and S4 that guide the respective light beams to the other photosensitive drum surfaces 7b, 7c, and 7d for C (cyan), M (magenta), and Y (yellow) colors, one reflector mirror 8e is used to ensure a space of a toner cartridge.

In this embodiment, unlike the above-mentioned first embodiment, because the light beam is not incident on the deflection surface of the optical deflector 5 at an angle in the sub scanning direction, the light beam deflected by the optical deflector 5 passes through the optical axes of the first lens 61a and second imaging lens 61b, which are disposed in the optical path, within the sub scanning section. For this reason, the optical aberration generated when the light beam passes through the ends of the imaging lenses is not likely to occur, which is suitable for the high-definition image forming apparatus.

Further, in this embodiment, the optical housing 9 in which the optical elements are disposed and housed is disposed in each of the optical paths S1, S2, S3, and S4 (each of the scanners K, C. M, and Y), independently. As a result, the positional deviation of the scanning line on the photosensitive drum surface in the sub scanning direction, which is generated in the optical path S1 in which the three reflector mirrors 8e, 8f, and 8g are disposed, is adjusted by eccentrically rotating the reflector mirror 8g which is disposed in the vicinity of the photosensitive drum 7a in the sub scanning direction (directed by an arrow A of FIG. 7).

Further, the positional deviation of the scanning line on the photosensitive drum surface in the sub scanning direction, which is generated in the optical paths S2 to S4 other than the optical path S1 in which the largest number of reflector mirrors are disposed, is adjusted by eccentrically parallelizing the optical housings 9 of the optical paths S2 to S4 other than the optical path S1 in the sub scanning direction (directed by an arrow C of FIG. 7).

In the optical paths S2, S3, and S4, no reflector mirror is disposed at a position closer to the photosensitive drum surfaces 7b, 7c, and 7d than the second imaging lens 61b in the optical path. For this reason, when the reflector mirror 8e disposed at a position optically closest to the photosensitive drum surface is eccentrically rotated in the sub scanning direction to adjust the illuminated position, the passing position of the light beam on the second imaging lens 61b is deviated. As a result, the imaging spot on the photosensitive drum surface is deteriorated.

On the contrary, because the eccentric-parallelizing of the optical housing 9 per se in the sub scanning direction does not cause the deterioration of the imaging performance, this adjusting method suits for the high-quality color image forming apparatus.

This adjusting method is not limited to the configuration of this embodiment, but the same advantages as those in this embodiment may be obtained in the image forming apparatus in which one optical deflector is shared by two scanners.

In this embodiment, powers of the second imaging lenses 61b in the optical paths S1, S2, S3, and S4 on the optical axis within the sub scanning section are each set as follows. Further, a power of the imaging optical unit 61 on the optical axis within the sub scanning section is set as follows.

$\phi\_adj = 0.014$ $\phi\_all = 0.012$

In this case, the conditional expression (1) is satisfied.

Figure 10:
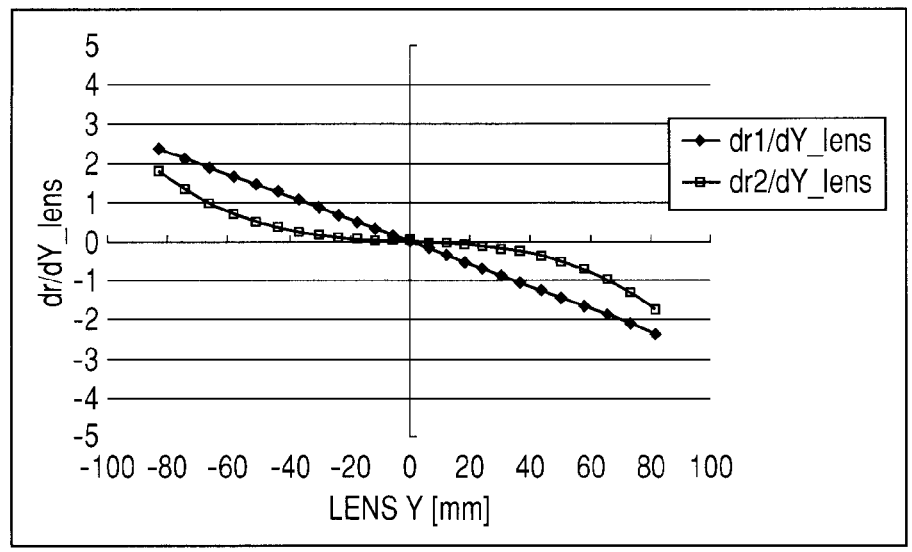
FIG. 10 is a diagram illustrating dr/dY_lens according to the second embodiment of the present invention.

In this embodiment, the differential values (variations) of the radius curvatures of the incident surface and the exit surface of the second imaging lens 61b in the optical paths S2, S3, and S4 within the sub scanning section in the effective scanning region to the main scanning direction are each set as illustrated in FIG. 10. Those variations satisfy the conditional expressions (2) and (3).

Thus, in this embodiment, in the simple illuminated position adjusting method as described above, the deterioration of the imaging spot shape on the surface to be scanned is suppressed, and the undesirable light is prevented from arriving at the surface to be scanned to form a high-quality image.

Embodiment 3

Figure 11:
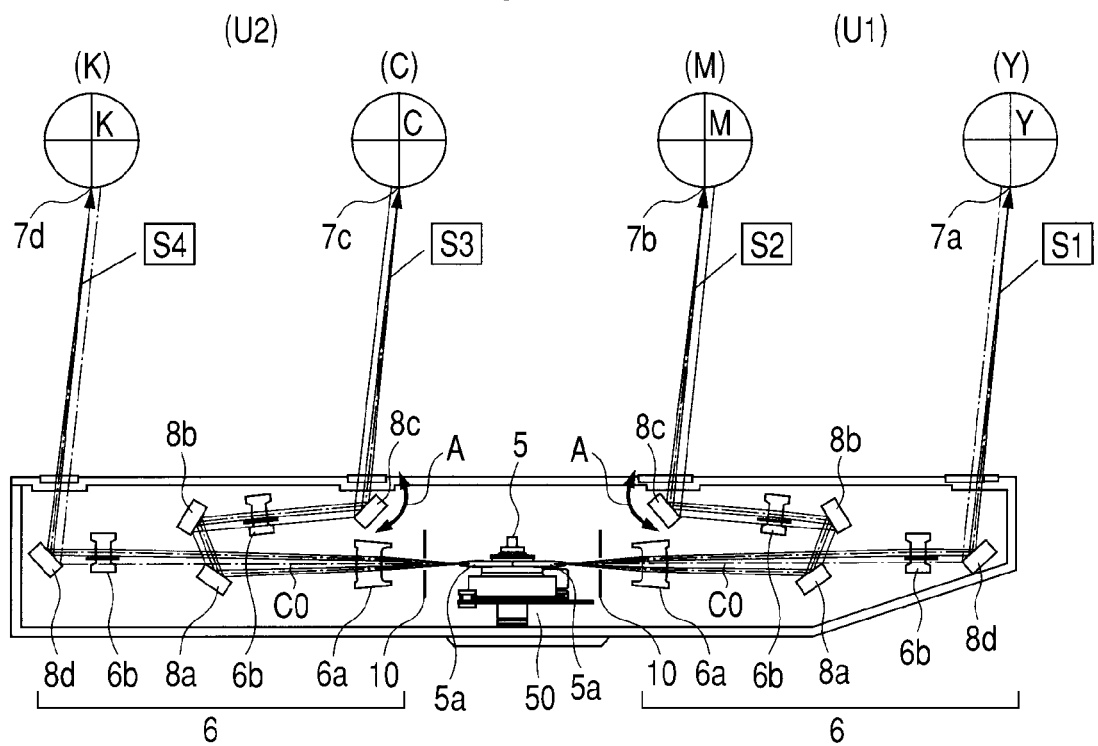
FIG. 11 is a cross-sectional view of an optical scanning apparatus taken along the sub scanning direction according to a third embodiment of the present invention.

FIG. 11 is a cross-sectional view (sub scanning cross-sectional view) of a main portion in a sub scanning direction according to a third embodiment of the present invention. In the figure, the same elements as those illustrated in FIG. 1 are denoted by identical reference numerals.

In this embodiment, a difference from the above-mentioned first embodiment resides in that the arrangement of the reflector mirrors is changed so as to correspond to a color image forming apparatus (optical scanning apparatus) in which the intervals between the respective photosensitive drums are narrow in the sub scanning direction.

Further, the illuminated position of the light beam on the surface to be scanned in the sub scanning direction in the optical paths S1 and S4 other than the optical paths S2 and S3 in which the largest number of reflector mirrors are disposed is electrically adjusted.

Other configurations and optical actions are identical with those in the first embodiment, thereby obtaining the same advantages.

That is, in this embodiment, the arrangement of the reflector mirrors is changed so as to correspond to the color image forming apparatus in which the intervals of the respective photosensitive drums are narrow in the sub scanning direction.

Further, in the optical path S2 (S3) in which the largest number of reflector mirrors are disposed, the deviation of the illuminated position on the surface to be scanned in the sub scanning direction is adjusted by the same adjusting method as that in the first embodiment.

That is, the reflector mirror 8c (8c) disposed closest to the surface to be scanned 7b (7c) in the optical path is eccentrically rotated in the sub scanning direction (an arrow A in FIG. 11) to adjust the illuminated position of the light beam on the surface to be scanned in the sub scanning direction.

On the other hand, in the optical path S1 (S4) other than the optical path S2 and S3 in which the largest number of reflector mirrors are disposed, the deviation of the illuminated position on the surface to be scanned in the sub scanning direction is adjusted as follows.

That is, in this embodiment, the respective registration detection images of four colors are formed on a transfer material that is transported on a transfer belt, and positions of the respective registration detection images are detected by a detection unit (not shown). Then, the illuminated position of the light beam on the surface to be scanned in the sub scanning direction is electrically adjusted based on a signal detected by the detection unit.

As a result, in this embodiment, a time required for adjusting the illuminated position in the optical path S1 (S4) may be reduced, and the number of adjusting tools is also decreased.

Similarly, it is conceivable that the positions of the respective registration detection images are detected by the detection unit in the optical path S2 (S3), and electrically adjusted based on the detected signal. However, the amount of correction which may be electrically performed has an upper limit. For this reason, in the optical path S2 (S3) in which a large number of reflector mirrors are disposed, and the amount of adjustment is large, it is desirable to adjust the illuminated position by the reflector mirror 8c (8c) disposed at a position closest to the photosensitive drum surface in the optical path.

Thus, in this embodiment, in the simple illuminated position adjusting method as described above, the deterioration of the imaging spot shape on the surface to be scanned is suppressed, and the undesirable light is prevented from arriving at the surface to be scanned to form a high-quality image.

This embodiment may be applied to the above-mentioned second embodiment. When this embodiment is applied to the second embodiment, the illuminated position of the light beam on the surface to be scanned in the sub scanning direction in the optical paths S2 to S4 other than the optical path S1 in which the largest number of reflector mirrors are disposed is electrically adjusted.

<Color Image Forming Apparatus>

Figure 12:
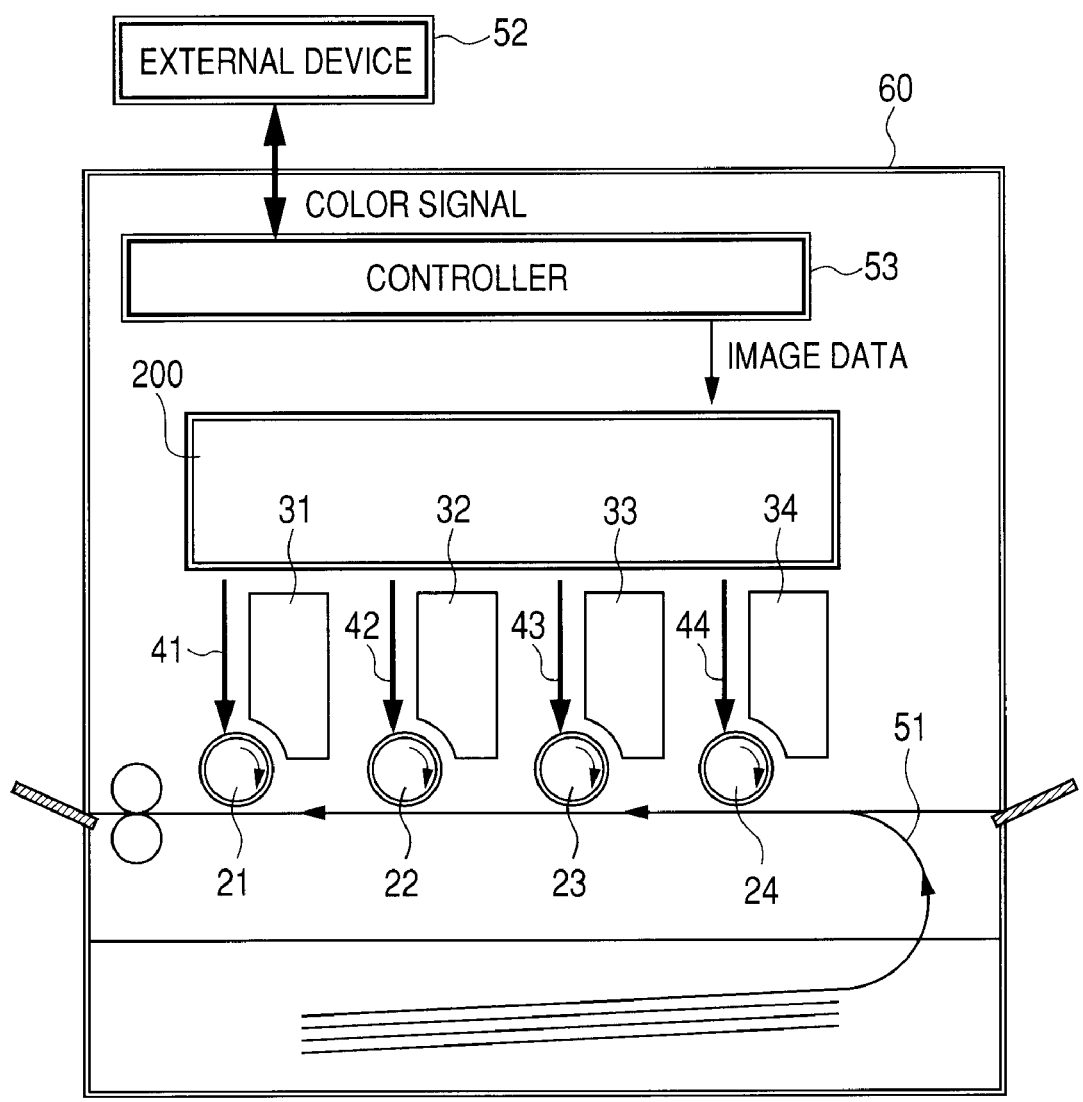
FIG. 12 is a schematic diagram illustrating a main portion of a color image forming apparatus according to an embodiment of the present invention.

FIG. 12 is a main portion schematic diagram illustrating a color image forming apparatus according to an embodiment of the present invention.

This embodiment describes a tandem type color image forming apparatus in which an optical scanning apparatus performs scanning photosensitive members each serving as an image bearing member with four beams parallelly to record image information thereon. In FIG. 12, a color image forming apparatus 60 includes an optical scanning apparatus 200 having the structure described in any one of the first to third embodiments, photosensitive drums 21, 22, 23, and 24 each serving as an image bearing member, developing devices 31, 32, 33, and 34, and a transport belt 51.

In FIG. 12, respective color signals of red (R), green (G), and blue (B) are input from an external device 52 such as a personal computer to the color image forming apparatus 60. The color signals are converted into pieces of image data (dot data) of yellow (Y), magenta (M), cyan (C), and black (B) by a printer controller 53 in the color image forming apparatus. The pieces of image data are input to the optical scanning apparatus 200. Light beams 41, 42, 43, and 44 which are modulated according to the respective pieces of image data are emitted from the optical scanning apparatus 200. The photosensitive surfaces of the photosensitive drums 21, 22, 23, and 24 are scanned with the light beams in a main scanning direction.

According to the color image forming apparatus in this embodiment, the optical scanning apparatus 200 performs the scanning with the four beams which respectively correspond to the respective colors of yellow (Y), magenta (M), cyan (C), and black (B). The image signals (image information) are recorded in parallel on the photosensitive drum surfaces 21, 22, 23, and 24, thereby printing a color image at high speed.

According to the color image forming apparatus in this embodiment, as described above, latent images of the respective colors are formed on the corresponding surfaces of the photosensitive drums 21, 22, 23, and 24 using the light beams based on the respective pieces of image data by the scanning optical device 200. After that, the multi-transfer is performed on a recording material to produce a full color image.

For example, a color image reading apparatus including a CCD sensor may be used as the external device 52. In this case, the color image reading apparatus and the color image forming apparatus 60 constitute a color digital copying machine.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-010535, filed Jan. 21, 2009, which is hereby incorporated by reference herein in its entirety.

What is claimed is:

1. An adjusting method for an illuminated position in an optical scanning apparatus,
the optical scanning apparatus comprising:
a plurality of light source units;
a common deflection unit for deflecting for scanning a plurality of light beams emitted from the plurality of light source units; and
a plurality of imaging optical units each comprising at least one imaging optical element and at least one light beam reflection unit which are disposed in optical path of the light beam deflected for scanning on a deflection surface of the common deflection unit, and image the light beam on a surface to be scanned,
the adjusting method comprising rotating the light beam reflection unit, in a sub scanning direction, which is disposed optically closest to the surface to be scanned in an optical path in which a largest number of the light beam reflection units are disposed among the optical paths of the plurality of light beams guided to the plurality of surfaces to be scanned, to thereby adjust the illuminated position of the light beam, which illuminates the surface to be scanned, on the surface to be scanned in the sub scanning direction, and
eccentrically parallelizing the imaging optical element, in the sub scanning direction, which is disposed optically closest to the surface to be scanned among the at least one imaging optical element in the optical paths other than the optical path in which the largest number of the light beam reflection units are disposed, to thereby adjust the illuminated position of the light beam on the surface to be scanned in the sub scanning direction,
wherein the following condition is satisfied, $$0.5 \times \phi\_all \leq \phi\_adj \leq 2 \times \phi\_all,$$

wherein the optical paths others than the optical path in which the largest number of the light beam reflection units are disposed, $\phi\_adj$ represents a power of the imaging optical element disposed optically closest to the surface to be scanned on an optical axis within a sub scanning section among the at least one imaging optical element, and $\phi\_all$ represents a power of all of the at least one imaging optical element disposed in the same optical path on the optical axis within the sub scanning section.

2. An adjusting method for an illuminated position in an optical scanning apparatus,
the optical scanning apparatus comprising:
a plurality of light source units;
a common deflection unit for deflecting for scanning a plurality of light beams emitted from the plurality of light source units; and
a plurality of imaging optical units each comprising at least one imaging optical element and at least one light beam reflection unit which are disposed in optical path of the light beam deflected for scanning on a deflection surface of the common deflection unit, and image the light beam on a surface to be scanned,
the adjusting method comprising rotating the light beam reflection unit, in a sub scanning direction, which is disposed optically closest to the surface to be scanned in an optical path in which a largest number of the light beam reflection units are disposed among the optical paths of the plurality of light beams guided to the plurality of surfaces to be scanned, to thereby adjust the illuminated position of the light beam, which illuminates the surface to be scanned, on the surface to be scanned in the sub scanning direction, and
eccentrically parallelizing the imaging optical element, in the sub scanning direction, which is disposed optically closest to the surface to be scanned among the at least one imaging optical element in the optical paths other than the optical path in which the largest number of the light beam reflection units are disposed, to thereby adjust the illuminated position of the light beam on the surface to be scanned in the sub scanning direction,
wherein the following conditions are satisfied:

$$0 \leq |dr1/dY\_lens| \leq 5; \text{ and}$$

$$0 \leq |dr2/dY\_lens| \leq 5,$$

where in the optical paths other than the optical path in which the largest number of the light beam reflection units are disposed, $dr1/dY\_lens$ represents a differential value (variation) of a radius of curvature of an incident surface of the imaging optical element disposed optically closest to the surface to be scanned within the sub scanning section in an effective scanning region with respect to a main scanning direction, and dr2/dY_lens represents a variation differential value of a radius of curvature of an exit surface of the imaging optical element disposed optically closest to the surface to be scanned within the sub scanning section in an effective scanning region with respect to the main scanning direction.

3. An adjusting method according to claim 1, wherein the plurality of imaging optical units are disposed so as to opposed to each other with respect to a rotating axis of the deflection unit.

4. An adjusting method for an illuminated position in an optical scanning apparatus,
the optical scanning apparatus comprising a plurality of optical housings, the plurality of optical housings each containing:
  a light source unit;
  a deflection unit for deflecting for scanning a light beam emitted from the light source unit; and
  an imaging optical unit comprising at least one imaging optical element and at least one light beam reflection unit which image the light beam deflected for scanning on a deflection surface of the deflection unit, on a surface to be scanned,
the adjusting method comprising rotating the light beam reflection unit, in a sub scanning direction, which is disposed optically closest to the surface to be scanned in an optical housing in which a largest number of the light beam reflection units are disposed in the optical path of the light beam extending from the deflection unit to the surface to be scanned, to thereby adjust the illuminated position of the light beam, which illuminates the surface to be scanned, on the surface to be scanned in the sub scanning direction, and
eccentrically parallelizing in the sub scanning direction, the optical housings other than the optical housing in which the largest number of the light beam reflection units are disposed in the optical path extending from the deflection unit to the surface to be scanned, to thereby adjust the illuminated position of the light beam on the surface to be scanned in the sub scanning direction,
wherein the following condition is satisfied, $$0.5 \times \phi\_all \leq \phi\_adj \leq 2 \times \phi\_all,$$

where in the optical paths others than the optical path in which the largest number of the light beam reflection units are disposed, $\phi\_adj$ represents a power of the imaging optical element disposed optically closest to the surface to be scanned on an optical axis within a sub scanning section among the at least one imaging optical element, and $\phi\_all$ represents a power of all of the at least one imaging optical element disposed in the same optical path on the optical axis within the sub scanning section.

5. An adjusting method for an illuminated position in an optical scanning apparatus,
the optical scanning apparatus comprising a plurality of optical housings, the plurality of optical housings each containing:
  a light source unit;
  a deflection unit for deflecting for scanning a light beam emitted from the light source unit; and
  an imaging optical unit comprising at least one imaging optical element and at least one light beam reflection unit which image the light beam deflected for scanning on a deflection surface of the deflection unit, on a surface to be scanned,
the adjusting method comprising rotating the light beam reflection unit, in a sub scanning direction, which is disposed optically closest to the surface to be scanned in an optical housing in which a largest number of the light beam reflection units are disposed in the optical path of the light beam extending from the deflection unit to the surface to be scanned, to thereby adjust the illuminated position of the light beam, which illuminates the surface to be scanned, on the surface to be scanned in the sub scanning direction, and
eccentrically parallelizing in the sub scanning direction, the optical housings other than the optical housing in which the largest number of the light beam reflection units are disposed in the optical path extending from the deflection unit to the surface to be scanned, to thereby adjust the illuminated position of the light beam on the surface to be scanned in the sub scanning direction,
wherein the following conditions are satisfied:

$$0 \leq |dr1/dY\_lens| \leq 5; \text{ and}$$

$$0 \leq |dr2/dY\_lens| \leq 5,$$

where in the optical paths other than the optical path in which the largest number of the light beam reflection units are disposed, dr1/dY_lens represents a differential value of a radius of curvature of an incident surface of the imaging optical element disposed optically closest to the surface to be scanned within the sub scanning section in an effective scanning region with respect to a main scanning direction, and dr2/dY_lens represents a differential value of a radius of curvature of an exit surface of the imaging optical element disposed optically closest to the surface to be scanned within the sub scanning section in an effective scanning region with respect to the main scanning direction.

6. An adjusting method according to claim 2, wherein the plurality of imaging optical units are disposed so as to opposed to each other with respect to a rotating axis of the deflection unit.

7. An optical scanning apparatus comprising:
  a plurality of light source units;
  a common deflection unit for deflecting for scanning a plurality of light beams emitted from the plurality of light source units; and
  a plurality of imaging optical units each comprising at least one imaging optical element and at least one light beam reflection unit which are disposed in optical path of the light beam deflected for scanning on a deflection surface of the common deflection unit, and image the light beam on a surface to be scanned, wherein
the light beam reflection unit which is disposed optically closest to the surface to be scanned in an optical path in which a largest number of the light beam reflection units are disposed among the optical paths of the plurality of light beams guided to the plurality of surfaces to be scanned, is rotated in a sub scanning direction, to thereby adjust the illuminated position of the light beam, which illuminates the surface to be scanned, on the surface to be scanned in the sub scanning direction,
the imaging optical element which is disposed optically closest to the surface to be scanned among the at least one imaging optical element in the optical paths other than the optical path in which the largest number of the light beam reflection units are disposed, is eccentrically parallelized in the sub scanning direction, to thereby adjust the illuminated position of the light beam on the surface to be scanned in the sub scanning direction, and
the following condition is satisfied, $$0.5 \times \phi\_all \leq \phi\_adj \leq 2 \times \phi\_all,$$

where in the optical paths others than the optical path in which the largest number of the light beam reflection units are disposed, φ_adj represents a power of the imaging optical element disposed optically closest to the surface to be scanned on an optical axis within a sub scanning section among the at least one imaging optical element, and φ_all represents a power of all of the at least one imaging optical element disposed in the same optical path on the optical axis within the sub scanning section.

8. An optical scanning apparatus comprising:
a plurality of light source units;
a common deflection unit for deflecting for scanning a plurality of light beams emitted from the plurality of light source units; and
a plurality of imaging optical units each comprising at least one imaging optical element and at least one light beam reflection unit which are disposed in optical path of the light beam deflected for scanning on a deflection surface of the common deflection unit, and image the light beam on a surface to be scanned, wherein
the light beam reflection unit which is disposed optically closest to the surface to be canned in an optical path in which a largest number of the light beam reflection units are disposed among the optical paths of the plurality of light beams guided to the plurality of surfaces to be scanned, is rotated in a sub scanning direction, to thereby adjust the illuminated position of the light beam, which illuminates the surface to be scanned, on the surface to be scanned in the sub scanning direction,
the imaging optical element which is disposed optically closest to the surface to be scanned among the at least one imaging optical element in the optical paths other than the optical path in which the largest number of the light beam reflection units are disposed, is eccentrically parallelized in the sub scanning direction, to thereby adjust the illuminated position of the light beam on the surface to be scanned in the sub scanning direction, and
the following conditions are satisfied:

$$0 \leq |dr1/dY\_lens| \leq 5; \text{ and}$$

$$0 \leq |dr2/dY\_lens| \leq 5,$$

where in the optical paths other than the optical path in which the largest number of the light beam reflection units are disposed, dr1/dY_lens represents a differential value of a radius of curvature of an incident surface of the imaging optical element disposed optically closest to the surface to be scanned within the sub scanning section in an effective scanning region with respect to a main scanning direction, and dr2/dY_lens represents a differential value of a radius of curvature of an exit surface of the imaging optical element disposed optically closest to the surface to be scanned within the sub scanning section in an effective scanning region with respect to the main scanning direction.

9. An optical scanning apparatus comprising:
a plurality of optical housing, each housing containing:
a light source unit;
a deflection unit for deflecting for scanning a light beam emitted from the light source unit; and
an imaging optical unit comprising at least one imaging optical element and at least one light beam reflection unit which are disposed in optical path of the light beam deflected for scanning on a deflection surface of the deflection unit, and image the light beam on a surface to be scanned, wherein
the light beam reflection unit which is disposed optically closest to the surface to be scanned in the optical housing in which a largest number of the light beam reflection units are disposed among in an optical path of the light beam guided to the plurality of surfaces to be scanned, is rotated in a sub scanning direction, to thereby adjust the illuminated position of the light beam, which illuminates the surface to be scanned, on the surface to be scanned in the sub scanning direction,
the imaging optical element which is disposed optically closest to the surface to be scanned among the at least one imaging optical element in the optical housing other than the optical housing in which the largest number of the light beam reflection units are disposed, is eccentrically parallelized in the sub scanning direction, to thereby adjust the illuminated position of the light beam on the surface to be scanned in the sub scanning direction, and
the following condition is satisfied, $$0.5 \times \phi\_all \leq \phi\_adj \leq 2 \times \phi\_all,$$

where in the optical housing other than the optical housing in which the largest number of the light beam reflection units are disposed, φ_adj represents a power of the imaging optical element disposed optically closest to the surface to be scanned on an optical axis within a sub scanning section among the at least one imaging optical element, and φ_all represents a power of all of the at least one imaging optical element disposed in the same optical path on the optical axis within the sub scanning section.

10. An optical scanning apparatus comprising:
a plurality of optical housing, each housing containing:
a light source unit;
a deflection unit for deflecting for scanning a light beam emitted from the light source unit; and
an imaging optical unit comprising at least one imaging optical element and at least one light beam reflection unit which are disposed in optical path of the light beam deflected for scanning on a deflection surface of the deflection unit, and image the light beam on a surface to be scanned, wherein
the light beam reflection unit which is disposed optically closest to the surface to be scanned in the optical housing in which a largest number of the light beam reflection units are disposed among in an optical path of the light beam guided to the plurality of surfaces to be scanned, is rotated in a sub scanning direction, to thereby adjust the illuminated position of the light beam, which illuminates the surface to be scanned, on the surface to be scanned in the sub scanning direction,
the imaging optical element which is disposed optically closest to the surface to be scanned among the at least one imaging optical element in the optical housing other than the optical housing in which the largest number of the light beam reflection units are disposed, is eccentrically parallelized in the sub scanning direction, to thereby adjust the illuminated position of the light beam on the surface to be scanned in the sub scanning direction, and
the following conditions are satisfied:

$$0 \leq |dr1/dY\_lens| \leq 5; \text{ and}$$

$$0 \leq |dr2/dY\_lens| \leq 5,$$

where in the optical housing other than the optical housing in which the largest number of the light beam reflection units are disposed, dr1/dY_lens represents a differential value of a radius of curvature of an incident surface of the imaging optical element disposed optically closest to the surface to be scanned within the sub scanning section in an effective scanning region with respect to a main scanning direction, and dr2/dY_lens represents a differential value of a radius of curvature of an exit surface of the imaging optical element disposed optically closest to the surface to be scanned within the sub scanning section in an effective scanning region with respect to the main scanning direction.

11. An image forming apparatus comprising:
a plurality of photosensitive drums each having a photosensitive surface;
a plurality of light source units;
a common deflection unit for deflecting for scanning a plurality of light beams emitted from the plurality of light source units; and
a plurality of imaging optical units provided corresponding to the photosensitive drums, each comprising at least one imaging optical element and at least one light beam reflection unit which are disposed in optical path of the light beam deflected for scanning on a deflection surface of the common deflection unit, and image the light beam on the photosensitive surface of the corresponding photosensitive drum, wherein
the light beam reflection unit which is disposed optically closest to the photosensitive surface in an optical path in which a largest number of the light beam reflection units are disposed among the optical paths of the plurality of light beams guided to the plurality of photosensitive surfaces, is rotated in a sub scanning direction, to thereby adjust the illuminated position of the light beam, which illuminates the photosensitive surface, on the photosensitive surface in the sub scanning direction,
the imaging optical element which is disposed optically closest to the photosensitive surface among the at least one imaging optical element in the optical paths other than the optical path in which the largest number of the light beam reflection units are disposed, is eccentrically parallelized in the sub scanning direction, to thereby adjust the illuminated position of the light beam on the photosensitive surface in the sub scanning direction, and the following condition is satisfied, $$0.5 \times \phi\_all \leq \phi\_adj \leq 2 \times \phi\_all,$$

where in the optical paths others than the optical path in which the largest number of the light beam reflection units are disposed, $\phi\_adj$ represents a power of the imaging optical element disposed optically closest to the photosensitive surface on an optical axis within a sub scanning section among the at least one imaging optical element, and $\phi\_all$ represents a power of all of the at least one imaging optical element disposed in the same optical path on the optical axis within the sub scanning section.

12. An image forming apparatus comprising:
a plurality of photosensitive drums each having a photosensitive surface;
a plurality of light source units;
a common deflection unit for deflecting for scanning a plurality of light beams emitted from the plurality of light source units; and
a plurality of imaging optical units provided corresponding to the photosensitive drums, each comprising at least one imaging optical element and at least one light beam reflection unit which are disposed in optical path of the light beam deflected for scanning on a deflection surface of the common deflection unit, and image the light beam on the photosensitive surface of the corresponding photosensitive drum, wherein the light beam reflection unit which is disposed optically closest to the photosensitive surface in an optical path in which a largest number of the light beam reflection units are disposed among the optical paths of the plurality of light beams guided to the plurality of photosensitive surfaces, is rotated in a sub scanning direction, to thereby adjust the illuminated position of the light beam, which illuminates the photosensitive surface, on the photosensitive surface in the sub scanning direction,
the imaging optical element which is disposed optically closest to the photosensitive surface among the at least one imaging optical element in the optical paths other than the optical path in which the largest number of the light beam reflection units are disposed, is eccentrically parallelized in the sub scanning direction, to thereby adjust the illuminated position of the light beam on the photosensitive surface in the sub scanning direction, and the following conditions are satisfied:

$$0 \leq |dr1/dY\_lens| \leq 5; \text{ and}$$

$$0 \leq |dr2/dY\_lens| \leq 5,$$

where in the optical paths other than the optical path in which the largest number of the light beam reflection units are disposed, dr1/dY_lens represents a differential value of a radius of curvature of an incident surface of the imaging optical element disposed optically closest to the photosensitive surface within the sub scanning section in an effective scanning region with respect to a main scanning direction, and dr2/dY_lens represents a differential value of a radius of curvature of an exit surface of the imaging optical element disposed optically closest to the photosensitive surface within the sub scanning section in an effective scanning region with respect to the main scanning direction.

13. An image forming apparatus comprising:
a plurality of photosensitive drums each having a photosensitive surface; and
a plurality of optical housing provided corresponding to the photosensitive drums, each housing containing:
a light source unit;
a deflection unit for deflecting for scanning a light beam emitted from the light source unit; and
an imaging optical unit comprising at least one imaging optical element and at least one light beam reflection unit which are disposed in optical path of the light beam deflected for scanning on a deflection surface of the deflection unit, and image the light beam on the photosensitive surface of the corresponding photosensitive drum, wherein
the light beam reflection unit which is disposed optically closest to the photosensitive surface in the optical housing in which a largest number of the light beam reflection units are disposed among in an optical path of the light beam guided to the plurality of photosensitive surfaces, is rotated in a sub scanning direction, to thereby adjust the illuminated position of the light beam, which illuminates the photosensitive surface, on the photosensitive surface in the sub scanning direction,
the imaging optical element which is disposed optically closest to the photosensitive surface among the at least one imaging optical element in the optical housing other than the optical housing in which the largest number of the light beam reflection units are disposed, is eccentrically parallelized in the sub scanning direction, to thereby adjust the illuminated position of the light beam on the photosensitive surface in the sub scanning direction, and the following condition is satisfied, $$0.5 \times \phi\_all \leq \phi\_adj \leq 2 \times \phi\_all,$$

where in the optical housing other than the optical housing in which the largest number of the light beam reflection units are disposed, φ_adj represents a power of the imaging optical element disposed optically closest to the photosensitive surface on an optical axis within a sub scanning section among the at least one imaging optical element, and φ_all represents a power of all of the at least one imaging optical element disposed in the same optical path on the optical axis within the sub scanning section.

14. An image forming apparatus comprising:
   a plurality of photosensitive drums each having a photosensitive surface;
   a plurality of optical housing, provided corresponding to the photosensitive drums, each housing containing:
      a light source unit;
      a deflection unit for deflecting for scanning a light beam emitted from the light source unit; and
      an imaging optical unit comprising at least one imaging optical element and at least one light beam reflection unit which are disposed in optical path of the light beam deflected for scanning on a deflection surface of the deflection unit, and image the light beam on the photosensitive surface of the corresponding photosensitive drum, wherein
   the light beam reflection unit which is disposed optically closest to the photosensitive surface in the optical housing in which a largest number of the light beam reflection units are disposed among in an optical path of the light beam guided to the plurality of photosensitive surfaces, is rotated in a sub scanning direction, to thereby adjust the illuminated position of the light beam, which illuminates the photosensitive surface, on the photosensitive surface in the sub scanning direction,
   the imaging optical element which is disposed optically closest to the photosensitive surface among the at least one imaging optical element in the optical housing other than the optical housing in which the largest number of the light beam reflection units are disposed, is eccentrically parallelized in the sub scanning direction, to thereby adjust the illuminated position of the light beam on the photosensitive surface in the sub scanning direction, and
   the following conditions are satisfied:

$$0 \leq |dr1/dY\_lens| \leq 5; \text{ and}$$

$$0 \leq |dr2/dY\_lens| \leq 5,$$

where in the optical housing other than the optical housing in which the largest number of the light beam reflection units are disposed, dr1/dY_lens represents a differential value of a radius of curvature of an incident surface of the imaging optical element disposed optically closest to the photosensitive surface within the sub scanning section in an effective scanning region with respect to a main scanning direction, and dr2/dY_lens represents a differential value of a radius of curvature of an exit surface of the imaging optical element disposed optically closest to the photosensitive surface within the sub scanning section in an effective scanning region with respect to the main scanning direction.

15. An optical scanning apparatus according to claim 7, wherein the plurality of imaging optical units are disposed so as to opposed to each other with respect to a rotating axis of the deflection unit.

16. An optical scanning apparatus according to claim 8, wherein the plurality of imaging optical units are disposed so as to opposed to each other with respect to a rotating axis of the deflection unit.

17. An image forming apparatus according to claim 11, wherein the plurality of imaging optical units are disposed so as to opposed to each other with respect to a rotating axis of the deflection unit.

18. An image forming apparatus according to claim 12, wherein the plurality of imaging optical units are disposed so as to opposed to each other with respect to a rotating axis of the deflection unit.

* * * * *